US010067361B2

(12) United States Patent
Ozaki et al.

(10) Patent No.: US 10,067,361 B2
(45) Date of Patent: Sep. 4, 2018

(54) EYEGLASS FITTING PARAMETER MEASUREMENT DEVICE AND STORAGE MEDIUM STORING EYEGLASS FITTING PARAMETER MEASUREMENT PROGRAM

(71) Applicant: NIDEK CO., LTD., Aichi (JP)

(72) Inventors: Yoshihiro Ozaki, Aichi (JP); Toru Arikawa, Aichi (JP); Toshihiro Kobayashi, Aichi (JP); Yujiro Tochikubo, Aichi (JP)

(73) Assignee: NIDEK CO., LTD., Aichi (JP)

( * ) Notice: Subject to any disclaimer, the term of this patent is extended or adjusted under 35 U.S.C. 154(b) by 15 days.

(21) Appl. No.: 15/080,051

(22) Filed: Mar. 24, 2016

(65) Prior Publication Data
US 2016/0202498 A1 Jul. 14, 2016

Related U.S. Application Data

(63) Continuation of application No. PCT/JP2014/075725, filed on Sep. 26, 2014.

(30) Foreign Application Priority Data

Sep. 27, 2013 (JP) .................. 2013-202570
Sep. 27, 2013 (JP) .................. 2013-202630
(Continued)

(51) Int. Cl.
A61B 3/10 (2006.01)
G02C 13/00 (2006.01)

(52) U.S. Cl.
CPC ......... G02C 13/003 (2013.01); G02C 13/006 (2013.01)

(58) Field of Classification Search
CPC .. G02C 13/006; G02C 13/003; G02C 13/005; G02C 13/008; A61B 3/02; A61B 3/185;
(Continued)

(56) References Cited

U.S. PATENT DOCUMENTS 7,768,516 B1    8/2010 Brandt
2003/0081173 A1 5/2003 Dreher
(Continued)

FOREIGN PATENT DOCUMENTS

EP    1011006 A1   6/2000
EP    1728467 A1   12/2006
(Continued)

OTHER PUBLICATIONS

International Search Report dated Jan. 6, 2015 filed in PCT/JP2014/075725.
(Continued)

Primary Examiner — Mustak Choudhury
(74) Attorney, Agent, or Firm — Rankin, Hill & Clark LLP

(57) ABSTRACT

There is an provided eyeglass fitting parameter measurement device including: a display control unit that displays a front image of an examinee wearing an eyeglass frame and a lateral image of the examinee wearing the eyeglass frame on a display part; and a position information detection unit that detects position information for determining the positions of the examinee's eyes or the eyeglass frame based on one of the front image and the lateral image. The display control unit provides a correspondence indication corresponding to the position information detected by the position information detection unit in a display area for the other of the front image and the lateral image based on the position information.

9 Claims, 11 Drawing Sheets

(30) Foreign Application Priority Data

Sep. 27, 2013 (JP) .................................. 2013-202631
Sep. 27, 2013 (JP) .................................. 2013-202632

(58) Field of Classification Search
CPC .. A61B 5/0205; G06Q 50/22; G06Q 30/0631; G06F 19/345; G06F 19/3406
USPC .............................. 351/204, 223, 246; 705/2
See application file for complete search history.

(56) References Cited

U.S. PATENT DOCUMENTS

| | | | |
|---|---|---|---|
| 2003/0090625 A1* | 5/2003 | Izumitani | G02C 13/003 351/204 |
| 2004/0189935 A1 | 9/2004 | Warden | |
| 2007/0118428 A1 | 5/2007 | Ueno | |
| 2009/0051871 A1* | 2/2009 | Warden | G02C 13/005 351/204 |
| 2011/0242481 A1 | 10/2011 | Wada | |
| 2013/0339043 A1* | 12/2013 | Bakar | A61B 3/185 705/2 |
| 2015/0109578 A1 | 4/2015 | Ourives | |

FOREIGN PATENT DOCUMENTS

| | | |
|---|---|---|
| JP | 11338905 A2 | 12/1999 |
| JP | 2003329541 A2 | 11/2003 |
| JP | 2005342186 A2 | 12/2005 |
| JP | 2007216049 A2 | 8/2007 |
| JP | 2007522496 | 8/2007 |
| JP | 2010266892 A2 | 11/2010 |
| JP | 2011-209530 | 10/2011 |
| WO | 2013093363 A1 | 6/2013 |

OTHER PUBLICATIONS

Supplementary partial European Search Report dated Mar. 29, 2017 issued in the corresponding European Patent Application No. 14846973.7.

* cited by examiner

EYEGLASS FITTING PARAMETER MEASUREMENT DEVICE AND STORAGE MEDIUM STORING EYEGLASS FITTING PARAMETER MEASUREMENT PROGRAM

CROSS-REFERENCE TO RELATED APPLICATION

This application claims priority from Japanese Patent Application Nos. 2013-202570, 2013-202630, 2013-202631, and 2013-202632, all filed with the Japan Patent Office on Sep. 27, 2013, the entire contents of which are hereby incorporated by reference.

BACKGROUND

1. Technical Field

The present disclosure relates to an eyeglass fitting parameter measurement device and a storage medium storing an eyeglass fitting parameter measurement program for measuring eyeglass fitting parameters necessary for the production of eyeglasses.

2. Related Art

<Background Technique 1>

For the production of eyeglasses, it is necessary to design eyeglass lenses or process and frame the eyeglass lenses such that the eyeglasses match prescription values obtained by an examination.

To this end, the face of an examinee wearing an eyeglass frame is photographed by an imaging apparatus. There is proposed an eyeglass fitting parameter measurement device that calculates the positions of the eyes (eye positions) relative to the eyeglass frame from the photographed image (refer to JP-A-2007-216049).

<Background Technique 2>

For the production of eyeglasses, the eyeglass fitting parameters for the selected eyeglass frame and the examinee to wear the eyeglass frame are measured to match the eyeglasses to the prescription values obtained by an examination. Then, the measured eyeglass fitting parameters are used to design the eyeglass lenses or process and frame the eyeglass lenses.

According to the typical devices, the face of the examinee wearing the eyeglass frame is photographed by the imaging apparatus, for example. The positions of the eyes (eye positions) relative to the eyeglass frame are measured from the photographed image, for example.

The functions of the typical devices are seen as being an important tool for the function of frame selection or lens selection. Many of the devices are capable of easy measurement at free positions.

To produce eyeglasses for both farsightedness and nearsightedness, the examiner checks if the examinee's visual lines pass through the reading points of eyeglass lenses for both farsightedness and nearsightedness (progressive lenses). In addition, the examiner causes the examinee to move the eyes in a manner specific to the examination for eyeglass lenses for both farsightedness and nearsightedness so as to look down without tilting the head. This examination method is called mirror method. According to the mirror method, seals dedicated for the selected lenses are correctly attached to marks on the lenses. Then, the examiner holding a mirror checks the examinee face-to-face.

SUMMARY

An eyeglass fitting parameter measurement device according to an embodiment includes: a display control unit that displays a front image of an examinee wearing an eyeglass frame and a lateral image of the examinee wearing the eyeglass frame on a display part; and a position information detection unit that detects position information for determining the positions of the examinee's eyes or the eyeglass frame based on one of the front image and the lateral image. The display control unit provides a correspondence indication corresponding to the position information detected by the position information detection unit in a display area for the other of the front image and the lateral image based on the position information.

DETAILED DESCRIPTION

Figure 1:
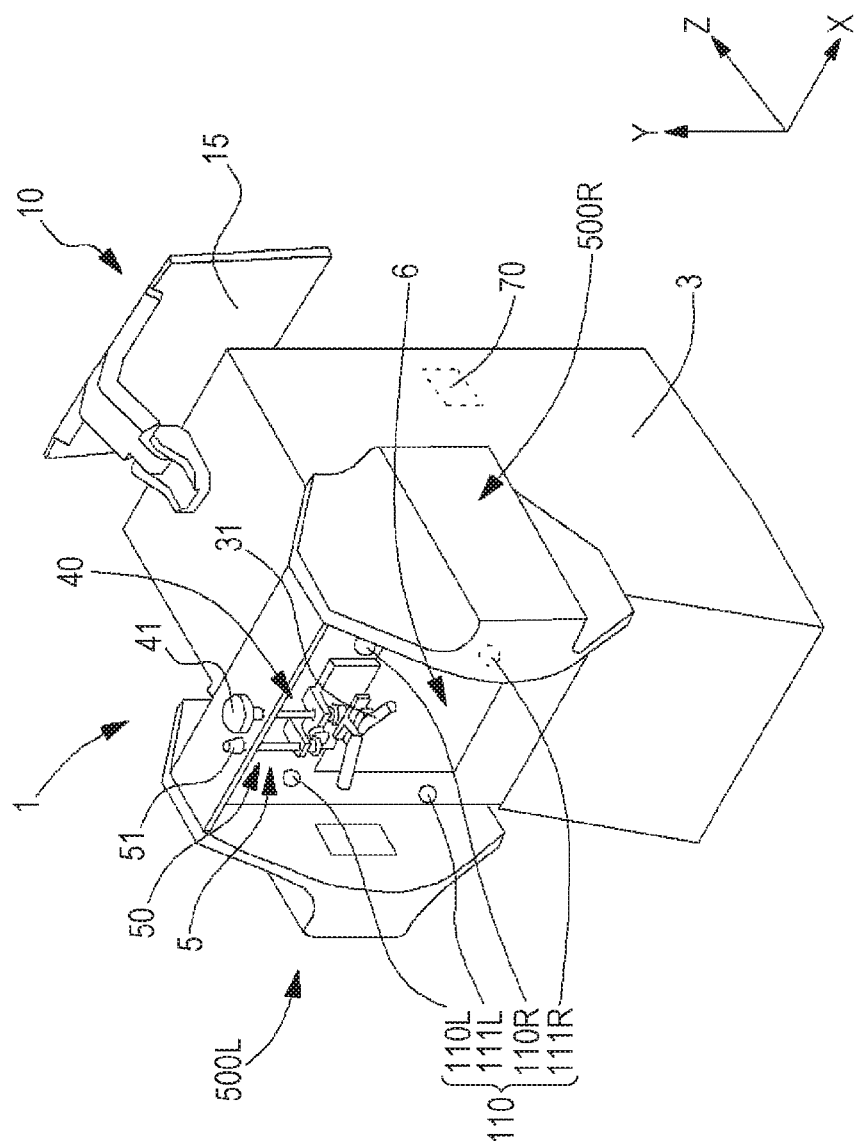
FIG. 1 is a schematic configuration diagram for describing an outer appearance of an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

<Problem 1>

According to the typical devices, a front image of the examinee photographed from the front direction and a lateral image of the examinee photographed from a single lateral direction are analyzed to measure various eyeglass fitting parameters.

The examiner is supposed to manually analyze the front image and the lateral image displayed on a display part while observing these images. However, it is difficult to acquire accurate parameters because the front image and the lateral image are not associated with each other. For example, it is difficult to determine the position of the pupil in the lateral image.

<Problem 2>

According to the typical devices, images of the examinee photographed under different photographing conditions are analyzed to measure various eyeglass fitting parameters. In addition, the photographed images and the analysis results are displayed in the display part to show the measurement results to the examiner.

However, when the images under different photographing conditions are displayed on the display part, the images may be less visible for lack of a sense of uniformity.

<Problem 3>

According to the typical devices, a front image of the examinee photographed from the front direction and a lateral image of the examinee photographed from a single lateral direction are analyzed to measure various eyeglass fitting parameters. In addition, the analyzed front and lateral images and the analysis results are displayed in the display part to show the measurement results to the examiner.

However, depending on the display form for displaying on the display part, the front image, the lateral image, and the analysis results may be seen in a manner different from that when the examiner actually observed them, and the display may be less visible.

<Problem 4>

According to the typical devices, the measurement is carried out while the examinee is in an unstable state. Accordingly, the reproducibility is low and the measurement is hard to make with accuracy. In addition, the above described mirror method requires lots of manual work and time. Accordingly, the typical devices are used less frequently.

As described above, the typical devices are insufficient in achieving accurate distant vision and near vision.

One of technical issues of the present disclosure is to provide an eyeglass fitting parameter measurement device and a storage medium storing an eyeglass fitting parameter measurement program that solve at least one of the problems of the known technique.

An eyeglass fitting parameter measurement device and a storage medium storing an eyeglass fitting parameter measurement program according to an embodiment is as follow.

(1) An eyeglass fitting parameter measurement device includes: a display control unit that displays a front image of an examinee wearing an eyeglass frame and a lateral image of the examinee wearing the eyeglass frame on a display part; and a position information detection unit that detects position information for determining the positions of the examinee's eyes or the eyeglass frame based on one of the front image and the lateral image. The display control unit provides a correspondence indication corresponding to the position information detected by the position information detection unit in a display area for the other of the front image and the lateral image based on the position information.

(2) In the eyeglass fitting parameter measurement device according to the above described device (1), the display control unit sets the correspondence indication displayed in the display area for the other image as a first correspondence indication. The display control unit provides a second correspondence indication corresponding to the position information detected by the position information detection unit in a display area for the one of the front image and the lateral image based on the position information.

(3) The eyeglass fitting parameter measurement device according to the above described device (1), includes an instruction acceptance unit that accepts an instruction from an examiner. The position information detection unit detects the position information based on an instruction signal from the instruction acceptance unit. The display control unit provides a correspondence indication in the display area for the other image based on the results of detection of the position information.

(4) In the eyeglass fitting parameter measurement device according to the above described device (3), the display control unit displays a first target in the front image and displays a second target at the same height as the first target in the lateral image. The position information detection unit detects the position information based on an instruction signal from the instruction acceptance unit for moving one of the first target and the second target. The display control unit moves the other of the first target and the second target in synchronization with the result of detection of the position information to change the display position of the correspondence indication in the display area for the other of the front image and the lateral image.

(5) The eyeglass fitting parameter measurement device according to the above described device (1), includes: an instruction acceptance unit that accepts an instruction from an examiner; and a second position information detection unit that, based on an instruction signal from the instruction acceptance unit regarding the display area for the other image in which the position information is displayed, detects position information for determining the positions of the examinee's eyes or the eyeglass frame in the other image.

(6) In the eyeglass fitting parameter measurement device according to the above described device (1), the one image is the front image. The other image is the lateral image.

(7) A non-transitory storage medium storing an eyeglass fitting parameter measurement program executed by a processor of an eyeglass fitting parameter measurement device for measuring eyeglass fitting parameters for an examinee by analyzing a front image of the examinee wearing an eyeglass frame and a lateral image of the examinee wearing the eyeglass frame to cause the eyeglass fitting parameter measurement device to perform: display control of displaying the front image and the lateral image on a display part; position information detection of detecting position information for determining the positions of the examinee's eyes or the eyeglass frame based on one of the front image and the lateral image; and correspondence indication provision of providing a correspondence indication corresponding to the position information detected by the position information detection unit in a display area for the other of the front image and the lateral image based on the position information.

(8) A non-transitory storage medium storing an eyeglass fitting parameter measurement program executed by a processor of an eyeglass fitting parameter measurement device for measuring eyeglass fitting parameters to cause the eyeglass fitting parameter measurement device to perform: display control of displaying on a display part a front image taken by a front imaging optical system configured to take the front image of an examinee wearing an eyeglass frame and a lateral image of the examinee wearing the eyeglass frame taken by a lateral imaging optical system configured to take the lateral image, the front imaging optical system being capable of changing an imaging distance to the examinee; and magnification correction of correcting the magnification rate of at least one of the front image and the lateral image according to a change in the imaging distance such that the reduction scales of the front image and the lateral image displayed on the display part become equal regardless of the change in the imaging distance.

(9) An eyeglass fitting parameter measurement device executing the eyeglass fitting parameter measurement program according to the above described program (8).

(10) In the eyeglass fitting parameter measurement device according to the above described device (1), the display control unit displays the front image, a right lateral image of the examinee, and a left lateral image of the examinee on the display part at the same time.

An eyeglass fitting parameter measurement device and an eyeglass fitting parameter measurement program according to an embodiment may be as follow.

(11) An eyeglass fitting parameter measurement device for measuring eyeglass fitting parameters for an examinee by analyzing a front image of the examinee wearing an eyeglass frame and a lateral image of the examinee wearing the eyeglass frame, includes: a display control unit that displays the front image and the lateral image on a display part; and a position information detection unit that detects position information for determining the positions of the examinee's eyes or the eyeglass frame based on one of the front image and the lateral image. The display control unit provides a correspondence indication corresponding to the position information detected by the position information detection unit in a display area for the other of the front image and the lateral image based on the position information.

(12) In an eyeglass fitting parameter measurement program executed in an eyeglass fitting parameter measurement device for measuring eyeglass fitting parameters for an examinee by analyzing a front image of the examinee wearing an eyeglass frame and a lateral image of the examinee wearing the eyeglass frame, a processor of the eyeglass fitting parameter measurement device executes the program to cause the eyeglass fitting parameter measurement device to perform: display control of displaying the front image and the lateral image on a display part; position information detection of detecting position information for determining the positions of the examinee's eyes or the eyeglasses based on one of the front image and the lateral image; and correspondence indication provision of providing a correspondence indication corresponding to the position information detected by the position information detection unit in a display area for the other of the front image and the lateral image based on the position information.

(13) An eyeglass fitting parameter measurement device includes: a front imaging optical system that takes a front image of an examinee wearing an eyeglass frame, the front imaging optical system being capable of changing an imaging distance to the examinee; and a lateral imaging optical system that takes a lateral image of the examinee wearing the eyeglass frame, the eyeglass fitting parameter measurement device being for measuring eyeglass fitting parameters based on the front image and the lateral image. The eyeglass fitting parameter measurement device includes: a display control unit that displays the front image taken by the front imaging optical system and the lateral image taken by the lateral imaging optical system on a display part; and a magnification correction unit that corrects the magnification rate of at least one of the front image and the lateral image according to a change in the imaging distance such that the reduction scales of the front image and the lateral image displayed on the display part become equal regardless of the change in the imaging distance.

(14) In an eyeglass fitting parameter measurement program executed in an eyeglass fitting parameter measurement device, the eyeglass fitting parameter measurement device including a front imaging optical system that takes a front image of an examinee wearing an eyeglass frame and a lateral imaging optical system that takes a lateral image of the examinee wearing the eyeglass frame, the eyeglass fitting parameter measurement device being for measuring eyeglass fitting parameters based on the front image and the lateral image, the front imaging optical system being capable of changing an imaging distance to the examinee, a processor of the eyeglass fitting parameter measurement device executes the program to cause the eyeglass fitting parameter measurement device to perform: display control of displaying the front image taken by the front imaging optical system and the lateral image taken by the lateral imaging optical system on a display part; and magnification correction of correcting the magnification rate of at least one of the front image and the lateral image according to a change in the imaging distance such that the reduction scales of the front image and the lateral image displayed on the display part become equal regardless of the change in the imaging distance.

(15) An eyeglass fitting parameter measurement device for measuring eyeglass fitting parameters for an examinee by analyzing a front image of the examinee wearing an eyeglass frame, a right lateral image of the examinee wearing the eyeglass frame, and a left lateral image of the examinee wearing the eyeglass frame, includes a display control unit that displays the front image, the right lateral image, and the left lateral image on a display part at the same time.

(16) In an eyeglass fitting parameter measurement program executed in an eyeglass fitting parameter measurement device for measuring eyeglass fitting parameters for an examinee by analyzing a front image of the examinee wearing an eyeglass frame, a right lateral image of the examinee wearing the eyeglass frame, and a left lateral image of the examinee wearing the eyeglass frame, a processor of the eyeglass fitting parameter measurement device executes the program to cause the eyeglass fitting parameter measurement device to perform display control of displaying the front image, the right lateral image, and the left lateral image on a display part at the same time.

(17) An eyeglass parameter measurement photographing device photographing an image for measuring eyeglass fitting parameters for use in production of eyeglasses, includes: a first measurement optical system that is provided with a distant fixation target for fixing an examinee's vision in a distant-vision state and a first imaging device for imaging the both eyes of the examinee set in the distant-vision state by the distant fixation target and for imaging an eyeglass frame worn by the examinee, the first measurement optical system guiding the distant fixation target to the examinee's eyes from a front direction and guiding light from the examinee including the both eyes to the first imaging device; and a second measurement optical system that is provided with a near fixation target for fixing the examinee's vision in a near-vision state and a second imaging device for imaging the both eyes of the examinee set in the near-vision state by the near fixation target and an eyeglass frame worn by the examinee, the near fixation target and the second imaging device being independent of the distant fixation target and the first imaging device, the second measurement optical system guiding the near fixation target to the examinee's eyes and guiding light from the examinee including the both eyes to the second imaging device. The first measurement optical system and the second measurement optical system are arranged independently from each other.

(18) An eyeglass parameter measurement photographing device includes: a measurement optical system that includes an imaging device imaging the both eyes of an examinee and an eyeglass frame worn by the examinee via a diaphragm; and a fixation target presenting optical system that includes a fixation target for fixing the examinee's vision, the eyeglass parameter measurement photographing device photographing an image for measuring eyeglass fitting parameters for use in production of eyeglasses. The diaphragm is arranged in an optical path of the measurement optical system such that an optical presenting distance of the fixation target to the examinee's eyes and an optical distance of the diaphragm to the examinee's eyes become equal.

(19) In an eyeglass parameter measurement photographing device, a fixation target presenting optical system is a fixation target presenting optical system that is capable of changing a presenting distance of a fixation target to an examinee. The eyeglass parameter measurement photographing device includes a distance-changeable unit that, when the presenting distance is changed, changes an optical distance of a diaphragm to the examinee's eyes such that an optical presenting distance of the fixation target to the examinee's eyes and the optical distance of the diaphragm to the examinee's eyes become equal.

Figure 2:
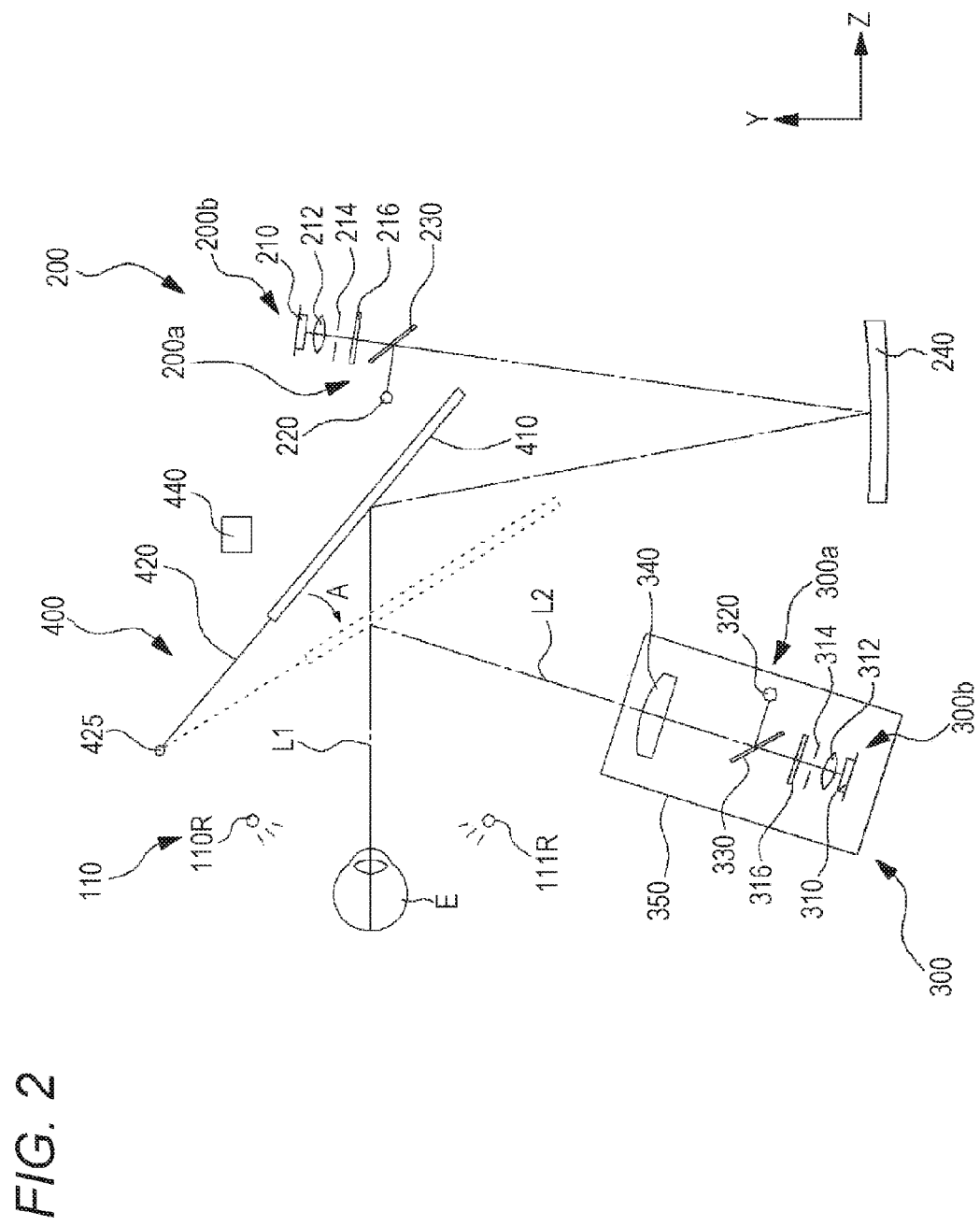
FIG. 2 is a schematic configuration diagram for describing optical systems of the embodiment.

An embodiment will be described below with reference to the drawings. In the following description, the horizontal direction of the examinee is set as X-axis direction, the vertical direction of the examinee as Y-axis direction, and the anteroposterior direction of the examinee as Z-axis direction. FIG. 1 is a diagram for describing a configuration of an eyeglass fitting parameter measurement device 1 of the embodiment. FIG. 2 is a cross-sectional view of the eyeglass fitting parameter measurement device 1 of the embodiment taken along a YZ plane at the time of distance measurement.
<Overview>

The device 1 mainly includes a front imaging optical system (for example, an imaging optical system 200b and an imaging optical system 300b), a lateral imaging optical system 500, and a display control unit (for example, a controller 70) (see FIG. 1). The front imaging optical system may take a front image 620 of an examinee wearing an eyeglass frame F, for example. The front imaging optical system may be capable of changing an imaging distance to the examinee, for example. The lateral imaging optical system 500 may take lateral images of the examinee wearing the eyeglass frame F (for example, a left lateral image 621 and a right lateral image 622), for example (see FIG. 5). The device may be used for the examinee not wearing the eyeglass frame. For example, the device may be used to monitor a difference between a pupil position of distant vision and a pupil position of near vision. The device 1 may measure eyeglass fitting parameters based on the front image 620 and the lateral images, for example.

The display control unit may display on a display part 15 the front image 620 taken by the front imaging optical system and the lateral images taken by the lateral imaging optical system 500. The front image 620 and the lateral images displayed on the display part 15 may be raw images or processed images (for example, denoised images). The display control unit may display concurrently the front image and the lateral images in parallel. The controller may cause the front image and the lateral images to be displayed at different timings.
<Magnification Correction Unit>

The device 1 includes a magnification correction unit (for example, the controller 70) (see FIG. 1). The magnification correction unit may correct the magnification rate of at least one of the front image 620 and the lateral images according to a change in the imaging distance, such that the reduction scales of the front image 620 and the lateral images displayed on the display part 15 become equal regardless of a change in the imaging distance (see FIG. 5).

Even when the imaging distance of the front imaging optical system to the examinee is changed, the magnification correction unit may correct the magnification rate of the front image taken by the front imaging optical system after the change of the imaging distance and maintain the magnification rate of the lateral images, such that the reduction scales of the lateral images and the front image 620 displayed after the change of the imaging distance become equal. To display the front image and the lateral images at the same reduction scale, the reduction scales may not be perfectly identical but may be merely regarded as identical by the examiner.

The imaging optical system may be capable of taking at least two front images at different imaging distances. For example, when the imaging distance of the front imaging optical system to the examinee is changed, the magnification correction unit may correct the magnification rate of the front image 620 taken by the front imaging optical system after the change of the imaging distance, such that the reduction scales of a first front image (front image 620 preliminarily displayed) and a second front image (front image 620 displayed after the change of the imaging distance) become equal.

To display the front image 620 and the lateral images, the display control unit may display the lateral images acquired before the change of the imaging distance. Alternatively, the display control unit may display the lateral images acquired after the change of the imaging distance. In addition, to display the front image 620 and the lateral images, the controller may set at least one of the front image and the lateral images as a still image. Further, to display the front image and the lateral images, the controller may set at least one of the front image and the lateral images as a moving image.

For example, when the imaging distance of the front imaging optical system to the examinee is changed, the magnification correction unit may correct the magnification rate of the front image taken by the front imaging optical system after the change of the imaging distance, such that the reduction scales of the lateral images and the front image displayed after the change of the imaging distance become equal. To correct the magnification rate of the image, the photographing magnification of the image may be corrected or the display magnification of the image may be corrected.
<Fixation Target Presenting Optical System>

The device 1 may further include a fixation target presenting optical system (for example, fixation target projecting optical systems 200a and 300a) (see FIG. 2).

The fixation target presenting optical system includes a fixation target (for example, light sources 220 and 320, and the like) to fix the examinee's vision. The presenting distance of the fixation target to the examinee is changeable.

The front imaging optical system may be capable of changing the imaging distance according to the change of the presenting distance. The front imaging optical system may take the front image 620 via a diaphragm (for example, diaphragms 214 and 314), for example.

The fixation target presenting optical system and the front imaging optical system may share part of an optical path. The fixation target presenting optical system may switch an optical presenting distance of the fixation target to the examinee's eyes between distant vision and near vision, or may change the near presenting distance. In this case, the optical presenting distance of the fixation target to the examinee's eyes and the imaging distance of the imaging optical system to the examinee's eyes are in a one-to-one relationship. Accordingly, the magnification correction unit may make magnification correction depending on the optical presenting distance of the fixation target to the examinee's eyes, as magnification correction depending on the imaging distance of the imaging optical system to the examinee's eyes.

<Distance-changeable Unit>

The front imaging optical system may include a distance-changeable unit (for example, an optical system moving unit 350). When the presenting distance is changed, the distance-changeable unit may change the optical distance of the diaphragm to the examinee's eyes, such that the optical presenting distance of the fixation target to the examinee's eyes and the optical distance of the diaphragm to the examinee's eyes become equal. The optical presenting distance of the fixation target to the examinee's eyes and the optical distance of the diaphragm to the examinee's eyes are adjusted to be equal. Accordingly, the correction calculations may not necessarily be required to determine the positions of the visual lines passing through the eyeglass lenses, for example.

The optical presenting distance of the fixation target to the examinee's eyes is adjusted by moving at least some of optical members in the fixation target presenting optical system. The optical distance of the diaphragm to the examinee's eyes is adjusted by moving at least some of optical members in the imaging optical system.

The front imaging optical system may be capable of changing the imaging distance to the examinee (for example, the optical distance from the eye to the imaging device), for example. The front imaging optical system may also change the imaging distance to the examinee according to the change of the optical presenting distance of the fixation target to the examinee's eyes.

<About a Display Layout>

Figure 5:
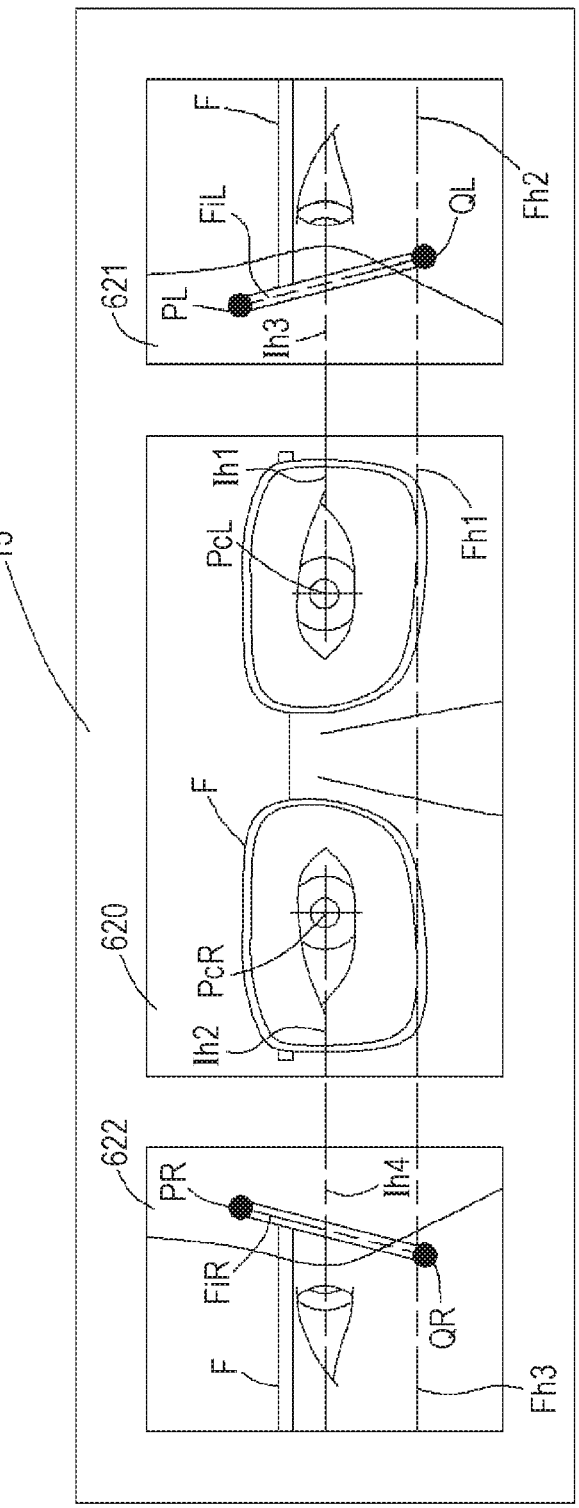
FIG. 5 is a diagram of an example of a screen displayed on a display part.

The display control unit may display concurrently the front image 620, the right lateral image 622, and the left lateral image 621 on the display part 15 (see FIG. 5). The number of the display part 15 may be one or more.

The display control unit may display the left lateral image 621 on the right side of the front image 620 and display the right lateral image 622 of the examinee on the left side of the front image 620 on the same screen of the display part 15.

For example, the display control unit may arrange a display area for the left lateral image 621 and a display area for the right lateral image 622 symmetrically with respect to the center of a display area for the front image 620.

<Reversal Processing Unit>

The device 1 may include a reversal processing unit. The reversal processing unit may display the right lateral image 622 and the left lateral image 621 taken by the lateral imaging optical system 500 via mirrors (for example, mirrors 530L and 530) in a reversed manner on the display part 15.

The reversal processing unit may be implemented by the use of an imaging device that outputs a reversed imaging signal or by the reversal in image processing performed by the display control unit, for example.

<Correspondence Indications>

Figure 4:
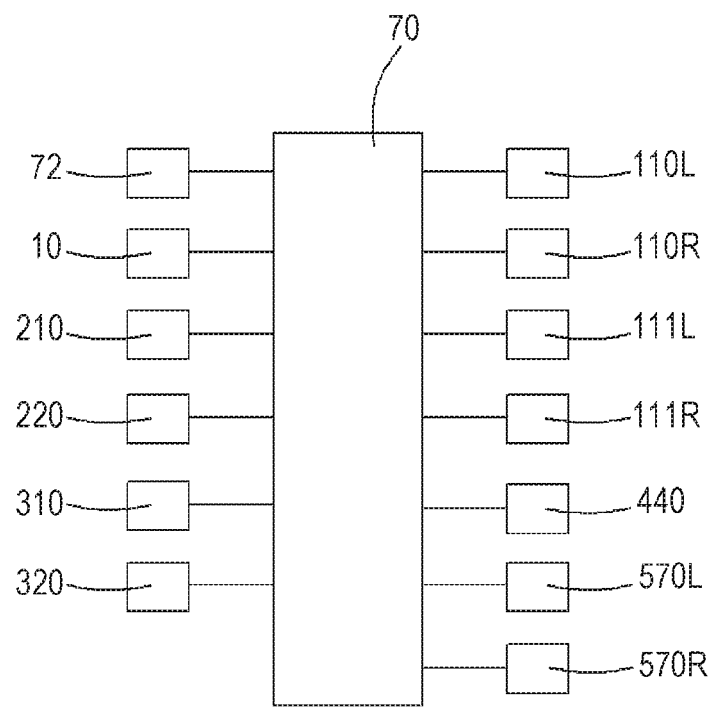
FIG. 4 is a block diagram of a control system of the embodiment.

The device 1 may include a position information detection unit (for example, the controller 70) (see FIGS. 1 and 4). The position information detection unit may detect position information for determining the positions of the examinee's eyes or the eyeglass frame based on one of the front image 620 and the lateral images (also called first image) (see FIG. 5). The eyeglasses include an eyeglass frame and eyeglass lenses, for example. The front image 620 and the lateral images include the eyeglass frame F and the examinee's eyes.

In this case, based on the position information detected by the position information detection unit, the display control unit may provide correspondence indications (for example, a horizontal line Ih1 and a horizontal line Ih3, and a frame lower end line Fh1 and a frame lower end line Fh3, and the like) corresponding to the position information in the display area for the other (also called second image) of the front image 620 and the lateral images 621 and 622.

For example, the position information detection unit may detect the position information for determining the positions of the examinee's eyes or eyeglasses based on the front image 620. The display control unit may provide a correspondence indication corresponding to the position information in the display area for the lateral image based on the detected position information. Needless to say, the opposite case is also applicable.

When the correspondence indication provided in the display area for the other image is designated as first correspondence indication, the display control unit may provide a second correspondence indication corresponding to the position information in the display area for the one of the front image 620 and the lateral images. For example, the display control unit may provide correspondence indications of both the corresponding images.

The device 1 may include an instruction acceptance unit. The instruction acceptance unit accepts an instruction from the examiner. The position detection unit may detect the position information based on an instruction signal from the instruction acceptance unit.

The position information detection unit may detect the position information for determining the positions of the examinee's eyes or eyeglasses by image processing of one of the front image 620 and the lateral images, for example. The position information detection unit may also accept the instruction signal from the examiner regarding at least one of the front image 620 and the lateral images to detect the position information related to the examinee's eyes or eyeglasses, for example. The position information detection unit may use these methods in combination. Alternatively, the results of the position detection by image processing may be adjusted based on the instruction signal from the examiner.

When the position information is detected, the position information detection unit may detect the position information based on both the images including the one image. For example, the position information detection unit detects an average positon in both the images, for example. The detection result may be overlapped with the other image.

To display the position information in the display area for the other image, a marking may be added to the position corresponding to the other image, for example. The position corresponding to the other image and the other positions may be displayed in different display modes (for example, different colors or different gradations, or the like).

The position information may be displayed in the display area for the other image. The position information may be displayed near the display area for the other image and a movable line may be electronically displayed on the other image in accordance with the position information.

The display control unit may display a first target (for example, the horizontal line Ih1 and the frame lower end line Fh1, and the like) on the front image 620, and display a second target (for example, the horizontal line Ih3 and the frame lower end line Fh3, and the like) corresponding to the height of the first target on the lateral images. In this case, the position information detection unit may detect the position information based on the instruction signal from the instruction acceptance unit for moving one of the first target and the second target.

The display control unit may move the other of the first target and the second target in a synchronous manner based on the detection result of the position information to change the display positon of the correspondence indication in the display area for the other of the front image 620 and the lateral images. The targets may be points, lines, regions, or the like.

The synchronous display may be a display control under which the other target is moved in conjunction with the movement of the one target, for example. The synchronous display may be a display control under which, when one point on the one image is clicked, the target for the other image is moved.

The device 1 may include a second position information detection unit that detects the position information for determining the positons of the examinee's eyes or eyeglasses in the other image, based on the instruction signal from the instruction acceptance unit regarding the display area for the other image in which the position information is displayed.

<Embodiment>

FIG. 1 is a schematic configuration diagram of an outer appearance of an eyeglass fitting image analysis device 1 according to an example. FIG. 2 is a schematic configuration diagram of optical systems stored in the eyeglass fitting image analysis device 1 according to the example. A configuration of the eyeglass fitting image analysis device 1 according to the example will be described with reference to FIGS. 1 and 2. As illustrated in FIG. 1, a main body 3 of the eyeglass fitting image analysis device contains various measurement optical systems, drive systems, and control systems described later, and others. The main body 3 includes a presenting window 5 on the examinee side. A presenting window 6 is a window through which fixation light flux passes to present a fixation target to the examinee. The main body 3 also includes a face supporting unit 5 on the examinee side. The face supporting unit 5 is a unit for supporting the examinee's face. The main body 3 includes an operating unit (operating part) 10 on the examiner side.

<Operating Unit>

The operating unit 10 outputs a signal according to an input operation instruction to the controller 70. The operating unit 10 of the example uses a touch panel-type display part 15. That is, the operating unit and the display part are unified in the example. As a matter of course, the operating unit and the display part may be separately provided. As a configuration example, the operating unit 10 includes at least one of operating parts such as a mouse, a joystick, and a keyboard. For example, the display part 15 may be a display mounted on the main body of the eyeglass fitting parameter measurement device 1 or a display connected to the main body. Needless to say, the display part 15 may not necessarily be a touch panel type. The display part 15 may be a display of a personal computer (hereinafter, referred to as PC), for example. In addition, the display part 15 may be a plurality of displays, for example. The display part 15 may display various images including photographed front images or lateral images of distant vision and near vision, and analysis results.

<Face Supporting Unit>

The face supporting unit 5 supports the examinee's forehead. The face supporting unit 5 keeps the constant distance between measurement optical systems described later (for example, a distant measurement optical system 200, a near measurement optical system 300, a reflective mirror 410, and others) and the examinee. The face supporting unit 5 can rotate in a right-left direction of the examinee and adjust the orientation of the examinee's face. Accordingly, when the orientation of the examinee's face is shifted in the right-left direction, the face supporting unit 5 can rotate the face supporting unit 30 such that the examinee is full-faced.

The face supporting unit 5 mainly includes a contact part 31, an operating distance adjustment part 40, and a right-left rotation adjustment part 50. The contact part 31 is a portion to be in contact with the examinee's face. The operating distance adjustment part 40 adjusts the position of the contact part 31 in the Z-axis direction to adjust the distance between the examinee and the measurement optical systems described later. In the example, the examiner operates an adjustment knob 41 of the operating distance adjustment part 40 to adjust the position of the contact part 31 in the Z-axis direction (operating distance direction). The horizontal turning adjustment part 50 adjusts the horizontal angle of the contact part 31 such that the examinee is full-faced. In the example, the examiner operates an adjustment knob 51 of the right-left rotation adjustment part 50 to adjust the horizontal angle of the contact part 31, for example.

The face supporting unit 5 is not limited to the configuration of the embodiment. In the example, the unit for supporting the examinee's forehead is provided. Alternatively, the unit may support the examinee's jaw, cheeks, nose, and the like. The face supporting unit 5 merely needs to support the examinee's face. In the example, the face supporting unit 5 is configured such that the adjustment knobs 41 and 51 are operated by the examiner to adjust the position of the contact part 31. However, the calibration of the face supporting unit 5 is not limited to this. The face supporting unit 5 may have a driving part such as a motor so that the operating unit 10 is operated to adjust the position of the contact part 31 by electromotion.

<Optical Systems>

Next, optical systems stored in the eyeglass fitting image analysis device 1 of the example will be described with reference to FIG. 2. The eyeglass fitting image analysis device 1 of the example mainly includes an illuminating optical system 110, the distant measurement optical system 200, the near measurement optical system 300, an optical path switching unit 400, and a lateral imaging optical system 500.

In the example, the distant measurement optical system 200 and the near measurement optical system 300 are used to photograph the front image of the examinee. The lateral imaging optical system 500 is used to photograph the lateral images of the examinee.

<Illuminating Optical System>

The illuminating optical system 110 mainly includes four light sources 110R, 110L, 111R, and 111L (110L and 111L are not illustrated in FIG. 2). The illuminating optical system 110 illuminates the examinee's face from four directions by the light sources 110R, 110L, 111R, and 111L. As a matter of course, the configuration of the illuminating optical system 110 is not limited to the foregoing one. The number of the light sources can be arbitrarily set and they can be arbitrarily arranged. The illuminating optical system 110 merely needs to illuminate the examinee's face by the light sources. For example, the illuminating optical system 110 may be provided under the face supporting unit 5 or above the presenting window 6.

The illuminating optical system 110 of the example uses an infrared light source. The use of the infrared light source and an infrared filter described later suppresses influence of ambient light (natural sunlight or the like). However, a visible light source may be used instead of the infrared light source.

<Distant Measurement Optical System>

The distant measurement optical system (hereinafter, also referred to as first measurement optical system) 200 will be described with reference to FIG. 2. The distant measurement optical system 200 is an optical system for measuring the positions of examinee's eyes E in a distant-vision state relative to an eyeglass frame. The distant measurement optical system 200 is divided into a first fixation target projecting optical system 200a and a first imaging optical system 200b. A measurement optical axis of the distant measurement optical system 200 is set as optical axis L1

The fixation target projecting optical system 200a projects a distant fixation target onto the examinee's eyes E to fix the examinee's vision in the distant-vision state. The fixation target projecting optical system 200a mainly includes a light source 220, a half mirror 230, and a concave mirror 240. The light source 220 serves as a fixation target to be projected onto the examinee's eyes E. The concave mirror 240 reflects light flux of the fixation target emitted from the light source 220 as approximately parallel light flux (or at a predetermined distant presenting distance).

The light flux of the fixation target emitted from the light source 220 is reflected by the half mirror 230. The reflected light flux is made coaxial with reflected light flux from the examinee described later. The light flux of the fixation target reflected by the half mirror 230 is then reflected by the concave mirror 240. The light flux of the fixation target reflected by the concave mirror 240 is then reflected by the reflective mirror 410 described later, and entered into the examinee's eyes E through the presenting window 6. The concave mirror 240 reflects the light flux of the fixation target as approximately parallel light flux (or at a predetermined distant presenting distance). Accordingly, the fixation target is seen from the examinee as being more distant in excess of the actual distance from the examinee's eyes E to the light source 220. After that, the light flux of the fixation target is reflected by the reflective mirror 410 described later and is entered into the examinee's eyes E through the presenting window 6.

The imaging optical system 200b photographs the examinee's face in the distant-vision state from the front direction. The examinee's face may not necessarily the entire face of the examinee. Specifically, the examinee's face here refers to at least the facial area surrounding the examinee's eyes E (for example, the front image of the examinee's face including at least the right and left eyes and the eyeglass frame). The imaging optical system 200b mainly includes an imaging device 210, an imaging lens 212, a diaphragm 214, an infrared filter 216, a half mirror 230, and a concave mirror 240.

The illuminating light from the illuminating optical system 110 is reflected by the examinee's face and passes through the presenting window 6. The illuminating light having passed through the presenting window 6 is reflected by the reflective mirror 410. The light reflected by the reflective mirror 410 is then reflected by the concave mirror 240 and passes through the half mirror 230 and the infrared filter 216. The infrared light having passed through the infrared filter 216 then passes through the diaphragm 214 and is converged by the imaging lens 212. After that, the converged infrared light forms an image on the imaging device 210. The imaging device 210 is in a conjugate relation with the pupil. The imaging device 210 detects the light and outputs a detection signal to the controller 70.

<Near Measurement Optical System>

The near measurement optical system (hereinafter, also referred to as second measurement optical system) 300 is an optical system for measuring the positions of the examinee's eyes E in the near-vision state. The near measurement optical system 300 is divided into a second fixation target projecting optical system 300a and a second imaging optical system 300b.

The fixation target projecting optical system 300a projects a near fixation target onto the examinee's eyes E for fixing the examinee's vision in the near-vision state. The fixation target projecting optical system 300a mainly includes a light source 320, a half mirror 330, and a convex lens 340. The light source 320 serves as a fixation target to be projected onto the examinee's eyes E.

The light flux of the fixation target emitted from the light source 320 is reflected by the half mirror 330 and is made coaxial with an optical axis L2. The light flux of the fixation target reflected by the half mirror 330 passes through the convex lens 340 and is converged. After that, the light flux of the fixation target is reflected by the reflective mirror 410 described later and is entered into the examinee's eyes E through the presenting window 6.

The imaging optical system 300b photographs the examinee's face in the near-vision state from the front direction. The imaging optical system 300b mainly includes an imaging device 310, an imaging lens 312, a diaphragm 314, an infrared filter 316, a half mirror 330, and a convex lens 340.

The illuminating light from the illuminating optical system 110 for illuminating the examinee's face passes through the presenting window 6 and is reflected by the reflective mirror 410. The light reflected by the reflective mirror 410 passes through the convex lens and is converged. The converged light flux passes through the half mirror 330 and the infrared filter 316. The infrared light having passed through the infrared filter 316 then passes through the diaphragm 314 and is converged by the imaging lens 312. After that, the converged infrared light forms an image on the imaging device 310. The imaging device 310 is in a conjugate relation with the pupil. The imaging device 310 detects the light and outputs a detection signal to the controller 70.

<Optical System Moving Unit>

The near measurement optical system 300 includes an optical system moving unit 350. The optical system moving unit 350 holds movably the near measurement optical system 300. At the time of near measurement, the optical system moving unit 350 can move the entire near measurement optical system 300 in accordance with a change in the angle of the reflective mirror 410 described later.

When the angle of the reflective mirror 410 is changed by the optical path switching unit 400 described later, the optical path of the fixation target projecting optical system 300a (the target presenting distance) and the optical path of the second imaging optical system 300b are also changed. Accordingly, the optical system moving unit 350 of the embodiment moves the entire near measurement optical system 300 in accordance with a change in the angle of the reflective mirror 410. As a result, the presenting distance of the near target is maintained even the angle of the reflective mirror 410 is changed. In addition, the focus state of the second imaging optical system 300b on the examinee's eyes E is maintained.

According to the optical system moving unit 350, the convex lens 340 for adjusting the presenting distance and the light source 320 for projecting the fixation target can be separately moved. The optical system moving unit 350 thus can change the relative distance between the convex lens 340 and the light source 320 and the presenting distance of the fixation target. The optical system moving unit 350 moves the optical members by driving the driving part such as a motor not illustrated, for example.

<Optical Path Switching Unit>

Returning to FIG. 2, the optical path switching unit 400 will be described. The optical path switching unit switches the optical path between the distant measurement optical system 200 and the near measurement optical system 300. The optical path switching unit 400 also changes the directions of the examinee's visual lines at the time of near measurement.

The optical path switching unit 400 mainly includes the reflective mirror 410, a mirror holding part 420, and a driving part 440.

The reflective mirror 410 is held by the mirror holding part 420. The upper portion of the mirror holding part 420 is held by a rotation shaft 425 fixed to the device. The mirror holding part 420 is turnable around a rotation axis of the rotation shaft 425. The mirror holding part 420 is turned together with the reflective mirror 410. The reflective mirror 410 reflects the light flux of the target emitted from the distant measurement optical system 200 or the near measurement optical system 300 toward the examinee's eyes E. The driving part 440 is coupled to the back surface of the mirror holding part 420 by a link mechanism part not illustrated. When the driving part 440 is driven, the driving force of the driving part is transferred to the mirror holding part 420 via the link mechanism part not illustrated. The mirror holding part 420 is turned around the rotation shaft 425 by the driving force transferred from a link mechanism part 430. When the mirror holding part is turned, the reflective mirror 410 is turned and moved around the rotation shaft 425.

When the reflective mirror 420 is turned, the optical path for the light flux of the target is changed. Accordingly, the presenting position of the fixation target to be projected onto the examinee's eyes E is changed. When the presenting position of the fixation target is changed, the directions of the examinee's visual lines are changed. For example, when the reflective mirror is rotated in a direction A (moved from a solid-line position to a dotted-line position), the optical path for photographing the examinee is switched from the optical path of the distant measurement optical system 200 to the optical path of the near measurement optical system 300. In this manner, the optical path switching unit 400 turns the reflective mirror 410 to change the presenting position of the fixation target and change the directions of the examinee's visual lines in the up-down direction.

<Lateral Imaging Optical System>

Figure 3:
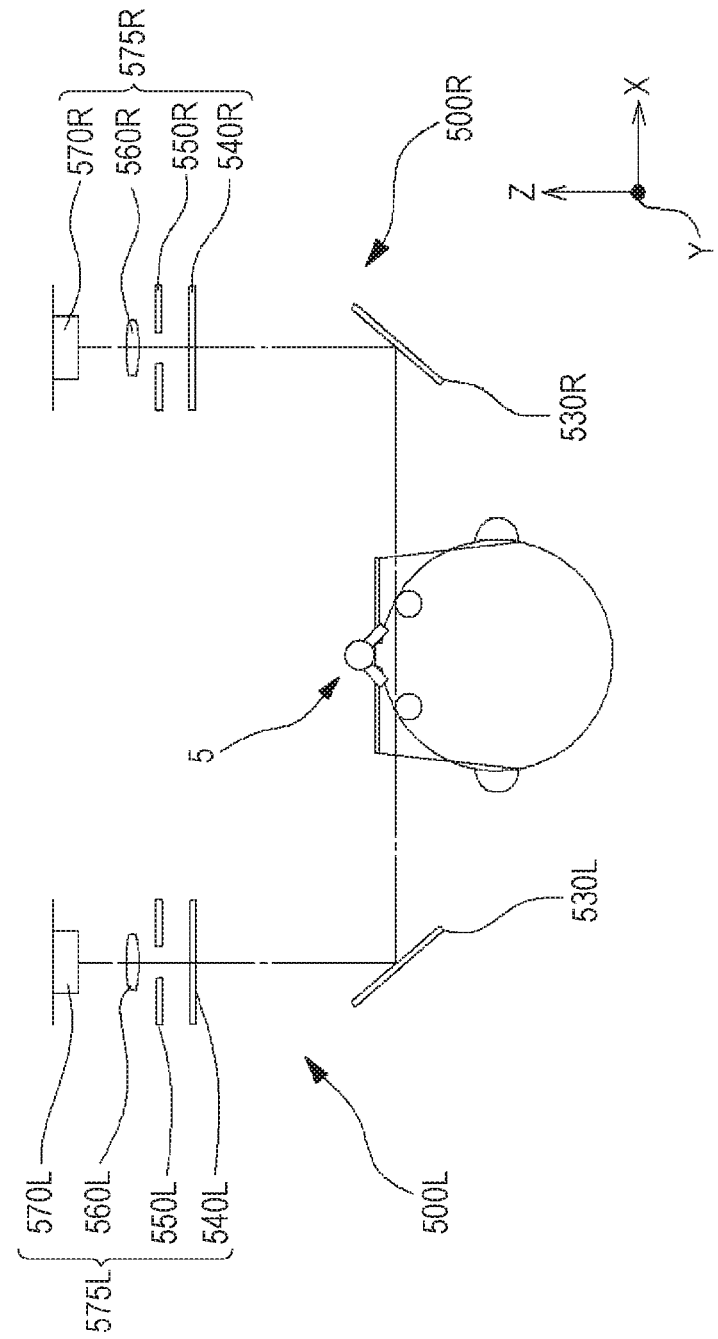
FIG. 3 is a schematic configuration diagram of a lateral imaging optical system of the embodiment.

FIG. 3 is a schematic configuration diagram of the lateral imaging optical system 500. The lateral imaging optical system 500 photographs the examinee from the lateral sides to acquire the lateral images of the examinee. As illustrated in FIG. 3, the lateral imaging optical system 500 is fixed in the right-left direction of the position where the examinee's face is supported.

The lateral imaging optical system 500 of the example is roughly divided into a left imaging optical system 500L arranged on the left side of the examinee and a right imaging optical system 500R arranged on the right side of the examinee. The left imaging optical system 500L photographs the examinee from the left side. The right imaging optical system 500R photographs the examinee from the right side.

The left imaging optical system 500L mainly includes a mirror 530L, an infrared filter 540L, a diaphragm 550L, an imaging lens 560L, and an imaging device 570L.

Similarly, the right imaging optical system 500R mainly includes a mirror 530R, an infrared filter 540R, a diaphragm 550R, an imaging lens 560R, and an imaging device 570R. In the following description, for the sake of convenience, the infrared filters 540L and 540R, the diaphragms 550L and 550R, the imaging lenses 560L and 560R, and the imaging devices 570L and 570R will be collectively designated as imaging parts 575L and 575R.

The infrared filters 540L and 540R absorb visible light and let infrared light through. The imaging devices 570L and 570R receive infrared light having passed through the infrared filters 540L and 540R.

In the example, adjustment light sources 590L and 590R are infrared light sources. The use of the infrared light sources and the infrared filters prevents the imaging lenses and others from being illuminated by ambient light and seen in the lateral images. However, the infrared light sources may not necessarily used but visible light sources or the like may be used instead. In this case, the infrared filters are not necessary.

The imaging of the lateral images will be described taking the left imaging optical system 500L as an example. The illuminating light flux from the illuminating optical system 110 is reflected by the examinee's face and the eyeglass frame F. The reflected illuminating light flux enters the left imaging optical system 500L. The illuminating light flux is then reflected by the mirror 530L. The light flux reflected by the mirror 530L passes through the infrared filter 540L. The infrared light having passed through the infrared filter 540L then passes through the diaphragm 550L, and is condensed by the imaging lens 560L to form an image on the imaging surface of the imaging device 570L. The imaging device 570L transmits the detected image to the controller 70. In this manner, the imaging device 570L takes the left lateral image of the examinee. As the left imaging optical system 500L does, the right imaging optical system 500R takes the right lateral image of the examinee.

In the embodiment, the measurement optical axes of the right and left lateral imaging optical systems 500L and 500R are at the same height in the Y-axis direction as the height of the measurement optical axis L1 of the distant measurement optical system 200.

<Controller>

FIG. 4 is a block diagram of a control system of the example. The controller 70 includes a CPU (processor), a RAM, a ROM, and others. The CPU of the controller 70 conducts control of the eyeglass fitting image analysis device 1. The RAM stores temporarily various kinds of information. The ROM of the controller 70 stores various programs and initial values for controlling the operation of the eyeglass fitting image analysis device 1, and others.

The controller 70 is electrically connected to a non-volatile memory (hereinafter, simply referred to as memory) 72, the operating unit 10, the light sources 110L, 110R, 111L, 110R, 220, and 320, the imaging devices 210, 310, 570L, and 570R, the driving part of the optical system moving unit 350, the driving part 440, and others.

The memory 72 is a non-transitory storage medium that can hold stored contents even when being powered off. For example, the memory 72 may be a hard disk drive, a flash ROM, or a USB memory detachably attached to the eyeglass fitting image analysis device 1. The memory 72 stores the distant-vision image or the near-vision image taken by the eyeglass fitting image analysis device 1, an imaging control program for controlling the imaging of the lateral images, and an image processing program for processing the distant-vision image or near-vision image and the lateral images. The memory 72 also stores various kinds of photographing information such as information on the photographed distant-vision image or near-vision image, and the photographing positions of the lateral images. The operating unit 10 accepts input of various operating instructions by the examiner.

<Automatic Analysis Method for the Front Image>

An example of an automatic analysis method will be described below. The controller 70 subjects the front image to image processing to detect pupil information (for example, pupil positions, pupil diameter, and the like) and frame information (for example, frame width, frame position, and the like). The controller 70 then measures various eyeglass fitting parameters based on the detection results. The eyeglass fitting parameters are an inter-pupil distance and an eye position height, for example. The eye position height is defined as height from the bottom of the eyeglass lens surface to the pupil.

<Automatic Analysis Method for Lateral Images>

The controller 70 may also subject the lateral images to image processing to detect eyeglass fitting parameters (for example, a pantoscopic angle).

In the embodiment, the pantoscopic angle is defined as an angle formed by the optical axis of the lens and the visual axis of the eye in a first eye position (generally in the horizontal direction) in a vertical plane. For example, the pantoscopic angle is determined by connecting at least two points on the frame and assuming the connecting line as indicating an inclination of the lens surface. The two points may be automatically detected by the controller 70. Alternatively, the two points may be manually designated as arbitrary points by the examiner.

<Output to the Display Part>

Upon completion of the image analysis, the controller 70 displays the photographed images, the parameters obtained by the analysis, and the like on the display part 15 (see FIG. 5). The controller 70 includes a processor that conducts various control processes (for example, a CPU) and a non-transitory storage medium that stores an analysis program. The processor executes the process described below according to the analysis program.

As illustrated in FIG. 5, for example, the controller 70 displays the photographed images having undergone the analysis. As the photographed images, the front image 620, the left lateral image 621, the right lateral image 622, and the like are displayed, for example. The examinee's eyes and the eyeglass frame are seen in the front image 620, the left lateral image 621, and the right lateral image 622, for example.

The front image 620 is the front image of the examinee's face taken by the imaging device 210 of the distant measurement optical system 200 or the imaging device 310 of the near measurement optical system 300. The front image 620 includes a front image of the examinee's eyes and the eyeglass frame, for example.

The left lateral image 621 is a left lateral image (lateral image) of the examinee's face taken by the left imaging optical system 500L. In reverse, the left lateral image 621 is an image of the examinee seen from the right hand of the examiner facing the examinee. The left lateral image 621 includes a left lateral image of the examinee's left eye and the eyeglass frame.

The right lateral image 622 is a right lateral image (lateral image) of the examinee's face taken by the right imaging optical system 500R. In reverse, the right lateral image 622 is an image of the examinee seen from the left hand of the examiner facing the examinee. The right lateral image 622 includes a right lateral image of the examinee's right eye and the eyeglass frame.

The left lateral image 621 is displayed on the right side of the front image 620 on the display part 15. That is, when the examiner sees the display screen of the display part 15, the left lateral image 621 is formed on the right side of the front image. The right lateral image 622 is displayed on the left side of the front image 620 on the display part 15. That is, when the examiner sees the display screen of the display part 15, the right lateral image 622 is formed on the left side of the front image.

As described above, in the embodiment, the measurement optical axis L1 of the distant measurement optical system 200 and the measurement optical axes of the left and right lateral imaging optical systems 500L and 500R are at the same height in the Y-axis direction. To display the front image 620 and the right and left lateral images 621 and 622, the controller 70 may set the images at the same height such that the positions corresponding to the measurement optical axes of the optical systems in the images are aligned with one another. As a result, for example, the position of the corneal apexes seen in the front image 620 and the positions of the corneal apexes seen in the lateral images 621 and 622 are displayed at the same height on the screen.

In this manner, the display part 15 of the embodiment displays the front image 620 and the right and left lateral images 621 and 622 of the examinee in a three-plane projection view. The three-plane projection view is defined as a view represented by arranging an image of an object projected from the left on the left side of the front image and arranging an image of the object projected from the right on the right side of the front image. That is, in the embodiment, the image of the opposing examinee's face seen from the left is displayed on the left side of the front image 620 at the same height. Similarly, the image of the opposing examinee's face seen from the right is displayed on the right side of the front image 620 at the same height.

As in the embodiment, the display of the right and left lateral images 621 and 622 allows the examiner to observe easily whether the examinee's face is shifted in the right-left direction. For example, in the embodiment, when the examinee is full-faced, the right and left lateral images 621 and 622 are symmetrical with respect to the front image 620. Meanwhile, when the right and left lateral images 621 and 622 are asymmetrical with respect to the front image 620, the examiner can determine that the examinee's face is shifted in the right-left direction.

In this case, the shift of the examinee's face can be corrected by adjusting the face supporting unit 5 such that the right and left lateral images 621 and 622 are symmetrical with respect to the front image 620. When only either one of the lateral images 621 and 622 is displayed, it is difficult to determine the degree of the adjustment of the face supporting unit 5 by observing the lateral image.

In addition, the display of the right and left lateral images 621 and 622 allows the examiner to measure a pantoscopic angle, an eyeglass fitting distance, and the like as described later.

The controller 70 may display the results of the analysis of the right and left lateral images 621 and 622 (positions of centers of the eyeballs' turns). For example, the centers of the eyeballs' turns are preferably displayed in the lateral images 621 and 622 rather than on the front image 620 because it is easier for the examiner to know where the eyeballs rotate around and simulate the directions of the examinee's visual lines.

The simultaneous display of the front image 620 and the right and left lateral images 621 and 622 have other aspects as described below.

In the device 1 of the embodiment, for example, the examiner can observe at a time the state of the examinee seen from the three directions of the front, right, and left sides. Therefore, the examiner can observe simultaneously the front image 620 and the right and left lateral images 621 and 622 to check easily the relation between the front side and the lateral sides of the examinee.

When the left side of the frame F is moved for fitting the eyeglasses, for example, the right side of the frame is also changed in position. Therefore, when only one of the lateral images 621 and 622 is displayed, the right-and-left relation cannot be observed. Accordingly, the examiner may not perform successfully the fitting of the eyeglasses. As compared to this, when the front image 620 and the right and left lateral images 621 and 622 are displayed, the examiner can make adjustments while viewing the right-and-left relation. Accordingly, the examiner can perform the operation easier.

The display of the front image 620 and the lateral images 621 and 622 at the same height allows the examiner to easily grasp the height relation among the images. For example, the examiner can determine the pupil positions in the lateral images 621 and 622 with reference to the height of the pupils in the front image 620.

When cameras (for example, the imaging devices 570L and 570R) photograph images via one reflection member (for example, the half mirror 330) as in the lateral imaging optical system of the embodiment, the photographed images appear reversed. The number of the reflection member is not limited to one and when the cameras photograph images via an odd number of reflection members, the photographed images also appear reversed.

In this case, the controller 70 displays the photographed images in a three-plane projection view. Accordingly, the photographed images may be horizontally reversed by image processing. For example, the controller 70 may display on the display part 15 the left lateral image 621 photographed by the left imaging optical system 500L and horizontally reversed by image processing. Similarly, the controller 70 may display on the display part 15 the right lateral image 622 photographed by the right imaging optical system 500R and horizontally reversed.

By reversing the photographed images, the state of the examinee displayed on the screen can be matched with the actual state of the observed examinee. Accordingly, it is possible to prevent the examiner from confusing the right and left lateral images. In addition, it is possible to save the examiner from having to consider the reversal of the images at the time of fitting of the eyeglasses with reference to the lateral images 621 and 622.

In the embodiment, the controller 70 makes magnification correction such that the reduction scale of the right and left lateral images 621 and 622 and the reduction scale of the front image 620 become equal. For example, the controller 70 may control the magnification rate of the front image 620 such that the reduction scale of the front image 620 becomes equal to the reduction scale of the right and left lateral images 621 and 622. The controller 70 may control the magnification rate of the lateral images 621 and 622 such that the reduction scale of the right and left lateral images 621 and 622 becomes equal to the reduction scale of the front image 620. The controller 70 may control the magnification rate of the front image 620 and the magnification rate of the lateral images 621 and 622 such that the reduction scale of the right and left lateral images 621 and 622 and the reduction scale of the front image 620 become equal.

<Magnification Correction Method>

A magnification correction method will be described. For example, the photographing magnifications are determined in advance from design data for the imaging optical systems 200b, 300b, and 500.

Then, the magnification rates of the images are changed by image processing to eliminate a difference in the reduction scale resulting from the imaging magnification rates, and the images are displayed at the changed magnification rates.

For example, it is assumed that the imaging magnification of the lateral imaging optical system 500 is 25% and the imaging magnification of the imaging optical system 200b is 50%. The controller 70 displays the front image 620 reduced by 50% on the display part 15. This allows the front image 620 and the right and left lateral images 621 and 622 to be equal in reduction scale.

By displaying the front image 620 and the lateral images 621 and 622 at the same magnification rate as described above, the results of image analysis can be represented in an easy-to-understand manner. In addition, the images can be displayed without creating a feeling of strangeness.

<Correspondence Display>

In the embodiment, the controller 70 displays the front image 620 and the right and left lateral images 621 and 622 on the display part 15 such that the analysis results are superimposed on the images. The controller 70 may superimpose the position information obtained from one of the front image 620 and the lateral image 621 (lateral image 622) on the other of the front image 620 and the lateral image 621 (lateral image 622). The coordinate position of the front image 620 and the coordinate position of the lateral image 621 (lateral image 622) are associated with each other in advance. That is, the front image 620 and the lateral image 621 (lateral image 622) are set in a positional correspondence relation with each other.

For example, when the pupil positions are detected in the front image 620, the controller 70 may use the correspondence relation to overlay the position information corresponding to the pupil positions detected in the front image 620 on the lateral image 621 (lateral image 622) (for example, the horizontal lines Ih3 and Ih4).

For example, when the lens lower end positions of the frame are detected in the front image 620, the controller 70 may use the correspondence relation to overlay the position information corresponding to the frame positions detected in the front image 620 on the lateral image 621 (lateral image 622) (for example, frame lower end lines Fh2 and Fh3). In the embodiment, the frame lower ends are defined as bottoms of the eyeglass lens surfaces.

As a matter of course, when the positions of the eyes or the frame (for example, the pupil positions and the frame positions) in the lateral image 621 (lateral image 622), the controller 70 may use the correspondence relation to overlay the position information corresponding to the position detected in the lateral image 621 (lateral image 622) on the front image 620.

The positions of the eyes or the frame may be detected automatically or manually. The detected positions of the eyes or the frame can be changed in the images depending on the individual examinees or eyeglass frames.

The results of the image analysis may be corrected by the examiner correcting manually the marks displayed in the images based on the results of the analysis. The marks displayed on the display part 15 will be described with reference to FIG. 5.

For example, a left pupil mark PcL, a right pupil mark PcR, the horizontal line Ih1, the horizontal line Ih2, and the frame lower end line Fh1 are superimposed on the front image 620.

The left pupil mark PcL indicates the left pupil position and is displayed at the pupil position obtained by the image analysis. The right pupil mark PcR indicates the right pupil position and is displayed at the pupil position obtained by the image analysis.

The horizontal line Ih1 is a horizontal line passing through the left eye position. The horizontal line Ih1 passes through the center of the left pupil mark PcL and extends in the right-left direction. The horizontal line Ih2 is a horizontal line passing through the right eye position. The horizontal line Ih2 passes through the center of the right pupil mark PcR and extends in the right-left direction. The frame lower end line Fh1 indicates the position of the bottom of the eyeglass frame F and extends in the right-left direction.

For example, the horizontal line Ih3, the frame lower end line Fh2, a point PL, a point QL, a frame inclination line FiL, and the like are mainly superimposed on the left lateral image 621.

The horizontal line Ih3 is a horizontal line passing through the left eye position. The horizontal line Ih3 is displayed at a position corresponding to the height of the left pupil mark PcL and the horizontal line Ih1 displayed in the front image 620. The frame lower end line Fh2 indicates the height of the bottom of the eyeglass frame F. The frame lower end line Fh2 is displayed at a position corresponding to the height of the frame lower end line Fh1 displayed in the front image 620.

The points PL and QL are displayed at positions on the frame detected by the analysis of the left lateral image 621. The frame inclination line FiL is a line segment connecting the points PL and QL.

For example, the horizontal line Ih4, the frame lower end line Fh3, a point PR, a point QR, a frame inclination line FiR, and the like are mainly superimposed on the right lateral image 622.

The horizontal line Ih4 is a horizontal line passing through the right eye position. The horizontal line Ih4 is displayed at a position corresponding to the height of the right pupil mark PcR and the horizontal line Ih2 displayed in the front image 620. The frame lower end line Fh3 indicates the height of the bottom of the eyeglass frame F. The frame lower end line Fh3 is displayed at a position corresponding to the height of the frame lower end line Fh1 displayed in the front image 620.

The points PR and QR are displayed at positions on the frame detected by the analysis of the right lateral image 622. The frame inclination line FiR is a line segment connecting the points PR and QR. The frame inclination line FiR allows the examiner to recognize visually the degree of forward inclination of the frame F, that is, the pantoscopic angle of the frame F.

Figure 6:
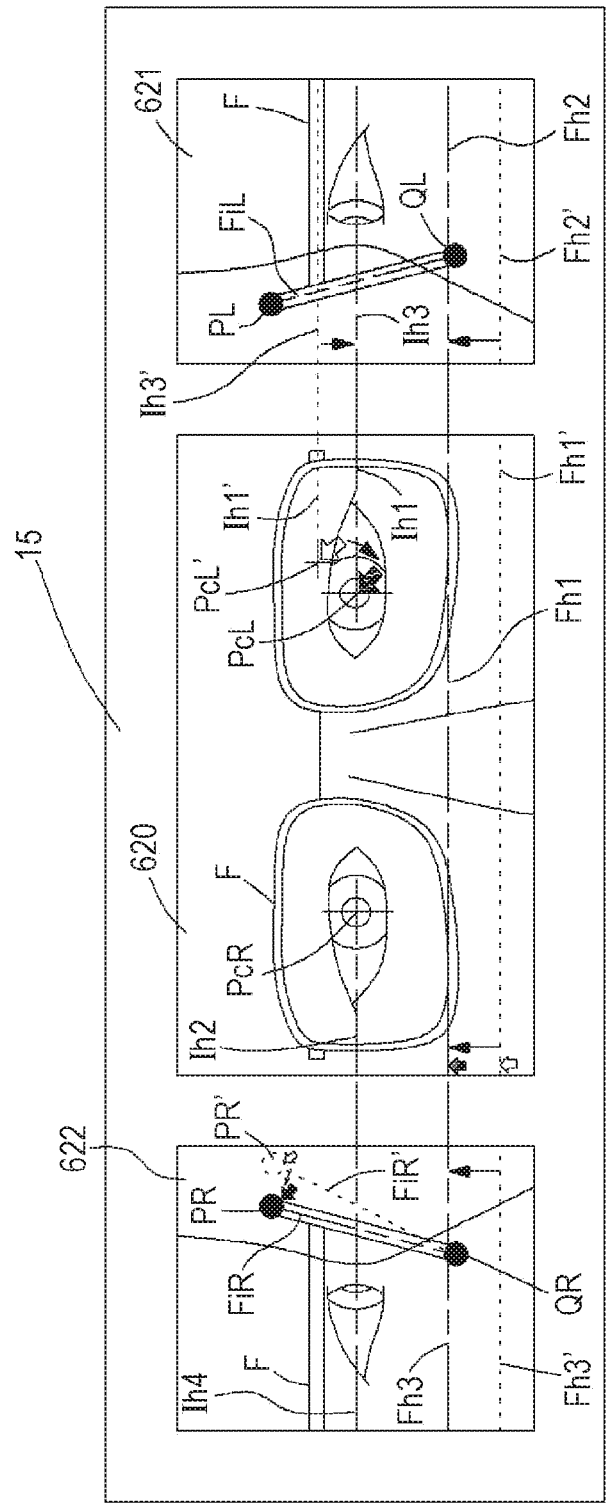
FIG. 6 is a diagram for describing an operation method using the screen displayed on the display part.
Figure 7:
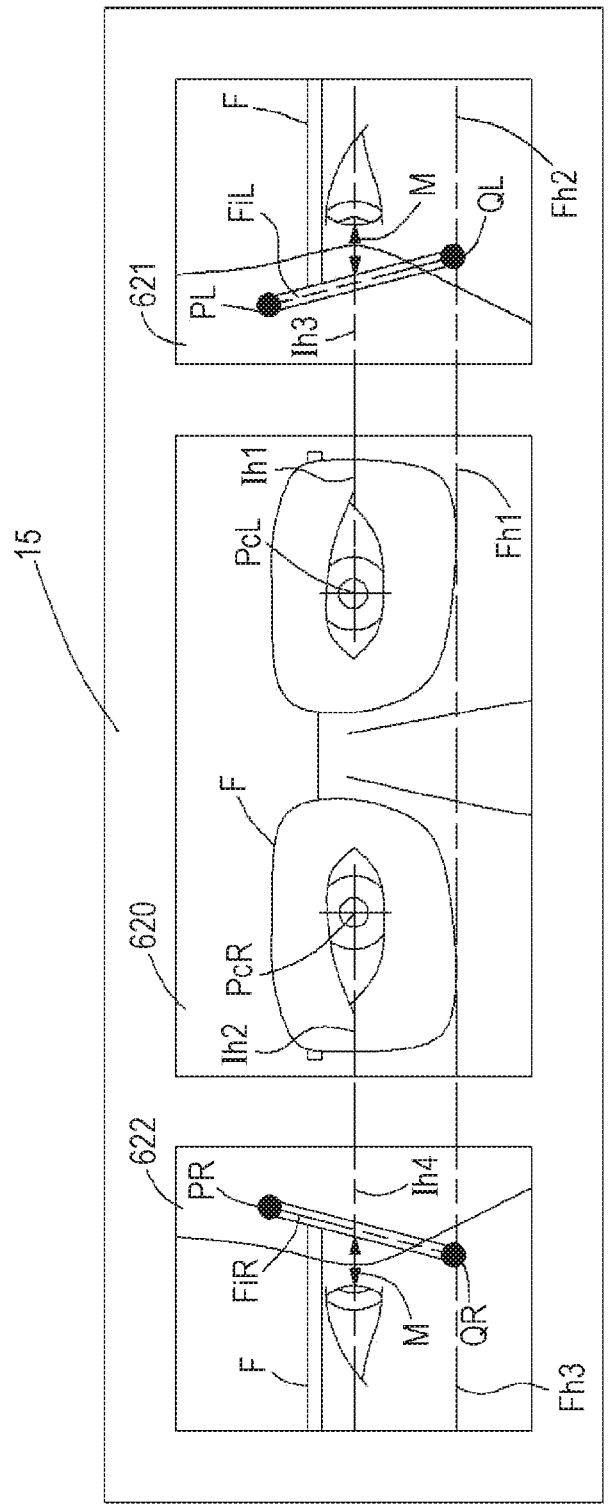
FIG. 7 is a diagram of an example of a screen displayed on the display part.

Referring to FIGS. 5 to 7, the horizontal line Ih1 and the horizontal line Ih3, the horizontal line Ih2 and the horizontal line Ih4, and the frame lower end line Fhl, the frame lower end line Fh2, and the frame lower end line Fh3 are connected together. However, the display form is not limited to this but the individual lines may be separately displayed.

In the embodiment, for example, the individual start marks are displayed at the heights corresponding to the front image 620 and the lateral images 621 and 622 such as the left pupil mark PcL and the horizontal line Ih1 and the horizontal line Ih3, or the frame lower end line Fh1 and the frame lower end line Fh3. This allows the measurement of the eyeglass fitting parameters with the association between the front image 620 and the lateral images 621 and 622.

For example, the directions of the examinee's visual lines are difficult to be recognized in the lateral images 621 and 622, and therefore the pupil positions are hard to be determined. However, the pupil positions can be easily determined by determining the positions of intersections between the horizontal lines Ih3 and Ih4 at the height of the pupils in the front image 620 and the outlines of the eyeballs in the lateral images 621 and 622, for example. As the horizontal lines Ih3 and Ih4, the marks displayed corresponding to the height of the pupil positions determined in the front image 620 provide aid for the determination of the pupil positions in the lateral images 621 and 622.

The pupil positions determined in the lateral images 621 and 622 are used for measurement of an eyeglass fitting distance VD and the like, for example.

As described above, the front image 620 and the lateral images 621 and 622 identical in height and magnification rate are displayed in a three-plane projection view. Accordingly, the correspondence relationship among the marks displayed in the front image 620 and the lateral images 621 and 622 can be more clarified. For example, the horizontal line Ih1 and the horizontal line Ih3 are displayed at the same height on the screen.

<Manual Measurement Method Using Screen display>

An operation example of the device 1 at the time of measurement of eyeglass fitting parameters using the measurement screen described above will be explained. In the example, the display positions of the foregoing marks indicating the results of the image analysis can be manually adjusted by the examiner's input. For example, even when an error occurs in the image analysis to shift the display positions of the marks from the images, the display positions of the marks can be aligned with the images. Accordingly, the controller 70 can measure the final eyeglass fitting parameters from the adjusted marks.

<Mark Adjustment Method>

A method for adjusting the display positions of the marks will be described with reference to FIG. 6. FIG. 6 shows by broken lines marks shifted from the correct display positions due to occurrence of an error in the image analysis.

For example, a left pupil mark PcL' shown by a broken line in FIG. 6 is shifted from the pupil position in the front image 620. In addition, a horizontal line Ih1' indicating the left eye position and a horizontal line Ih3' in the left lateral image 621 are shifted from the correct display positions.

In this case, for example, the examiner adjusts the display position of the left pupil mark PcL' by a pointing device not illustrated. The pointing device may be a touch panel, a mouse, or the like, for example. In the following description, the pointing device is a touch panel provided on the display part 15.

<Adjustment of the Left Pupil Mark>

The examiner touches the left pupil mark PcL' displayed in the front image 620 and then drags the same to the positon of the pupil in the front image 620. At that time, the controller 70 moves the display position of the left pupil mark PcL' to the position of the pupil in the front image 620.

In this case, the controller 70 moves the display position of the left pupil mark PcL'. At the same time, the controller 70 moves and displays the horizontal line Ih1' and the horizontal line Ih3' in conjunction with the movement of the left pupil mark PcL'. That is, the controller 70 controls the display such that the height of the left pupil mark PcL' matches the heights of the horizontal line Ih1' and the horizontal line Ih3'.

In this manner, the marks in the front image 620 and the marks in the lateral images 621 and 622 are displayed in conjunction with each other. Accordingly, the adjustment operation can be easily performed merely by adjusting the position of the mark on one side.

In the foregoing description, the left pupil mark PcL' displayed in the front image 620 is adjusted to display the horizontal line Ih1' and the horizontal line Ih3' in conjunction with each other. However, the display control is not limited to this. For example, the controller 70 may move the horizontal line Ih1' such that the left pupil mark PcL' and the horizontal line Ih3' are moved in conjunction with the movement of the horizontal line Ih1'. Alternatively, the controller 70 moves the horizontal line Ih3' displayed in the lateral image such that the left pupil mark PcL' and the horizontal line Ih1' displayed in the front image 620 are moved in conjunction with the movement of the horizontal line Ih3'.

As a matter of course, for the display control under which the marks are displayed in conjunction with each other, the controller 70 may control not only the front image 620 and the left lateral image 621 but also the front image 620 and the right lateral image 622 in the same manner.

The other marks can be adjusted in the same manner as the left pupil mark PcL'. For example, the frame lower end line Fhl' shown by a broken line in FIG. 6 is shifted from the frame lower end due to occurrence of an error in the image analysis. Similarly, a frame lower end line Fh2' and a frame lower end line Fh3' displayed corresponding to the height of the frame lower end line Fh1' are also shifted from the frame lower end.

In this case, by adjusting the display position of only one of the frame lower end lines, the display positions of the other frame lower end lines can also be adjusted.

A point PR' shown by a broken line in FIG. 6 is shifted from the frame upper end in the lateral images 621 and 622 due to occurrence of an error in the image analysis. In addition, a frame inclination line FiR' connecting the points PR' and QR is also shifted from the correct position.

In this case, as in the foregoing case, the position of the point PR' or the frame inclination line FiR' can be adjusted by the pointing device.

In the foregoing description, the controller 70 corrects the magnification rates of the images such that the front image 620 and the lateral images 621 and 622 are equal in reduction scale. However, the embodiment is not limited to this.

For example, the imaging magnification is different between the distant measurement optical system 200 and the near measurement optical system 300. This is because the optical distances from the imaging device 210 and the imaging device 310 to the cornea are different.

Accordingly, the controller 70 may correct the magnification rates of the images such that the reduction scales of the front images 620 photographed by the optical systems become equal. For example, the front image 620 photographed by the distant measurement optical system 200 and the front image 620 photographed by the near measurement optical system 300 are switched on the display part 15. In this case, the controller 70 corrects the magnification rates such that the reduction scales of the images are equal. In addition, the magnification rates of the front images 620 are preferably corrected such that the reduction scales of the front images 620 in the distant-vision state and the near-vision state become equal to the reduction scale of the lateral images 621 and 622.

As described above, the front image 620 and the lateral images 621 and 622 are displayed at the constantly equal reduction scale. This allows the examiner to easily grasp the correspondence relation between the front image 620 and the lateral images 621 and 622. In addition, this prevents the examiner from being confused about changes in the reduction scales of the images.

When the image needs to be enlarged due to its smaller scale than that of the lateral images 621 and 622, only the areas of the enlarged image corresponding to the lateral images 621 and 622 may be displayed on the display part 15. Accordingly, unnecessary areas of the image (the background of the examinee or the like) can be removed unlike in the case where the image is not enlarged. This prevents the image from being less visible.

In the embodiment, the optical system moving unit 350 can change the presenting distance of the fixation target at the time of near measurement. The optical system moving unit 350 changes the position of the imaging device 310. Accordingly, the photographing magnification of the front image 620 to be photographed by the near measurement optical system 300 changes. This is because the imaging device 310 moves in conjunction with the movement of the fixation target light source (the light source 320 or the like). When the photographing magnification changes, the reduction scale of the front image 620 to be displayed on the display part 15 also changes.

For example, when the near presenting distance changes from 25 to 50 cm, the imaging magnification of the imaging optical system 300*b* decreases. This is because the image photographed from a distance is to be smaller in size than the real thing.

Accordingly, each time the presenting distance of the fixation target changes, the reduction scale of the image changes. Therefore, the magnification rates of the front image 620 and the right and left lateral images 621 and 622 do not match, and it is hard to recognize the right-and-left correspondence. In some cases, due to the decreased scale of the image, it may be hard to observe the areas surrounding the eyeglasses to be measured.

To prevent the problem, the controller 70 corrects the magnification rates of the images such that the reduction scales of the front image 620 and the right and left lateral images 621 and 622 become equal even when the photographing magnification changes in accordance with the change in the presenting distance of the fixation target. For example, the controller 70 determines in advance the photographing magnification corresponding to the target presenting distance from the design data for the imaging optical systems 300*b* and 500 or the like. The controller 70 may perform image processing such that the reduction scales of the images become equal based on the photographing magnification corresponding to the target presenting distance. Alternatively, the controller 70 may correct the reduction scales of the front image 620 and the right and left lateral images 621 and 622 such that there is a match in a dimension of the photographing target (for example, the distance from the upper end to the lower end of the frame) common to the front image and the lateral images.

As described above, by changing the magnification rate of the front image 620 in accordance with a change in the imaging magnification, it is possible to prevent the examiner from being confused about the change in the reduction scale of the front image 620. For example, it is possible to prevent the image from being less visible due to a decrease in the scale of the image. In addition, the front image 620 and the lateral images 621 and 622 are displayed at the equal reduction scale. This allows the examiner to easily grasp the correspondence relation among the images.

In the embodiment, the heights of the measurement optical axes of the distant measurement optical system 200 and the lateral imaging optical system 500 in the Y-axis direction are set to be equal. However, the embodiment is not limited to this.

For example, when the heights of the measurement optical axes of the optical systems are different from each other, the controller 70 may shift the positons of the front image 620 and the right and left lateral images from each other by the amount of the height difference.

For example, the distant measurement optical system 200 and the lateral imaging optical system 500 photograph a jig with marks or scales on the front and side surfaces. The controller 70 may shift the front image 620 and the right and left lateral images 621 and 622 from each other such that the photographed marks in the images are at the same height on the screen.

In this manner, by setting the front image 620 and the lateral images 621 and 622 at the same height, the correspondence relation between the front image 620 and the lateral images 621 and 622 can be clarified. Accordingly, the examiner can easily measure the eyeglass fitting parameters. This causes a less feeling of strangeness to the examiner as compared to the state in which the right and left images are not at the same height.

In the embodiment, the front image 620 and the right and left lateral images 621 and 622 are displayed on the one display part 15. The present invention is not limited to this but the front image 620 may be displayed on one of a plurality of individually provided display parts and the lateral images 621 and 622 displayed on the other display part. This also produces the same advantages as those of the embodiment.

In the embodiment, the controller 70 displays the marks corresponding to the front image 620 and the lateral images 621 and 622. However, the present invention is not limited to the embodiment.

The controller 70 may display individual marks corresponding to the left lateral image 621 and the right lateral image 622. For example, the controller 70 accepts a signal input by the examiner into the operating unit 10, and moves the frame lower end line Fh2 displayed in the left lateral image 621 upward or downward. The controller 70 may also move the frame lower end line Fh3 displayed in the right lateral image 622 upward or downward in conjunction with the movement of the frame lower end line Fh2.

As another example, longitudinal reference lines not illustrated extending in the longitudinal direction are displayed in the right and left lateral images 621 and 622. The longitudinal reference lines may be intended to indicate alignment references in the direction of the operating distance, for example. The controller 70 accepts a signal input by the examiner into the operating unit 10 and moves the longitudinal reference line displayed in the left lateral image 621 rightward or leftward. The controller 70 may also move the longitudinal reference line displayed in the right lateral image 622 rightward or leftward in conjunction with the display of the left lateral image 621.

The left lateral image 621 and the right lateral image 622 are displayed such that the front and back sides of the direction of the operating distance are opposite to each other. Accordingly, when moving the longitudinal reference line in the left lateral image 621 leftward, for example, the controller 70 moves the longitudinal reference line in the right lateral image 622 rightward.

Similarly, when moving the longitudinal reference line displayed in the right lateral image 622, for example, the controller 70 displays the longitudinal reference line in the left lateral image 621 in conjunction with the movement.

In addition, as illustrated in FIG. 7, marks M may be displayed in the lateral images 621 and 622 to measure the eyeglass fitting distance VD. For example, the examiner adjusts the lengths of the marks M to be equal to the distances from the corneal apexes to the lens surfaces. Accordingly, the controller 70 can determine the eyeglass fitting distance VD from the lengths of the marks M. The controller 70 may display the marks M on the horizontal lines passing through the pupil marks PcL and PcR, for example. In addition, the controller 70 may move the marks M upward or downward in conjunction with the upward or downward movement of the pupil marks PcL and PcR.

In the foregoing description, the eyeglass frame F has a rim. However, some eyeglass frames have no rim (for example, a two-point frame) (see FIG. 7). When a rimless eyeglass frame is photographed from the front direction, the outline of the frame (or the lenses) is very narrow and it may be difficult to identify the edges of the lenses from the front image 620. It may also be difficult to detect the edges of the lenses even by the controller 70.

Meanwhile, when the rimless eyeglass frame is photographed from the lateral directions, the thickness of the lenses forms the outline of the frame (or the lenses). Therefore, the examiner can identify the edges of the lenses from the lateral images 621 and 622. The controller 70 can also easily detect the edges of the lenses.

As described above, the examiner or the controller 70 may identify the edges of the lenses more easily from the lateral images 621 and 622 than from the front image 620. In this case, for example, the controller 70 may display the horizontal line Fh3 in alignment with the lower ends of the lenses identified from the lateral images 621 and 622. The controller 70 may move the horizontal line Fh1 in the front image in conjunction with the movement of the horizontal line Fh3.

In this manner, the controller 70 may move not only the marks displayed in the lateral images 621 and 622 in conjunction with the marks displayed in the front image 620 but also may move the marks displayed in the front image 620 in conjunction with the lateral images 621 and 622.

In the foregoing description, the display part 15 displays the lateral images 621 and 622 on the left and right sides of the front image 620. However, the present invention is not limited to the embodiment. For example, the controller 70 may display the lateral images 621 and 622 on the upper and lower sides of the front image 620.

In such a case, the examiner can also observe the right and left lateral images 621 and 622 to check the shift of the examinee's face, the eyeglass fitting distance, and the like.

Even when the lateral images 621 and 622 are not arranged on the left and right sides of the front image, the controller 70 can display the marks corresponding to the images. This makes it easy to measure the eyeglass fitting parameters with an association between the front image 620 and the lateral images 621 and 622.

In the embodiment, the three images, that is, the front image 620 and the right and left lateral images 621 and 622 are displayed. However, the present invention is not limited to this. For example, even when two of the front image 620 and the right and left lateral images 621 and 622 are displayed, the magnification rates are to be corrected by image processing or the like such that the reduction scales of the two images become equal. Alternatively, marks corresponding to the two images may be displayed in the images.

In the foregoing description, the controller 70 performs image processing to correct the magnification rates of the front image 620 and the lateral images 621 and 622. However, the present disclosure is not limited to this. For example, the imaging optical system 200b, the imaging optical system 300b, and the lateral imaging optical system 500 may be designed with the same photographing magnification. This makes it possible to equalize the reduction scales of the images photographed by these optical systems.

The controller 70 may change the magnification rates of the images by controlling the driving part or the like not illustrated to move the optical members or the optical devices in the imaging optical systems.

The eyeglass fitting parameter measurement device 1 of the embodiment includes the plurality of imaging optical systems to photograph the images of the examinee. However, the eyeglass fitting parameter measurement device is not limited to this configuration but may not necessarily include the imaging optical systems, for example. In this case, the image data of the examinee photographed by an external imaging optical system is received by various data communication unit. The eyeglass fitting parameters of the examinee may be measured based on the received images.

The embodiment of the present disclosure can be expressed as first to eighth eyeglass fitting parameter measurement devices and first and second eyeglass fitting parameter measurement programs described below.

The first eyeglass fitting parameter measurement device includes: a front imaging optical system that takes a front image of an examinee wearing an eyeglass frame, the front imaging optical system being capable of changing an imaging distance to the examinee; and a lateral imaging optical system that takes a lateral image of the examinee wearing the eyeglass frame, the eyeglass fitting parameter measurement device being for measuring eyeglass fitting parameters based on the front image and the lateral image. The eyeglass fitting parameter measurement device includes: a display control unit that displays the front image taken by the front imaging optical system and the lateral image taken by the lateral imaging optical system on a display part; and a magnification correction unit that corrects the magnification rate of at least one of the front image and the lateral image according to a change in the imaging distance such that the reduction scales of the front image and the lateral image displayed on the display part become equal regardless of the change in the imaging distance. The eyeglass fitting parameter measurement device measures the eyeglass fitting parameters based on the front image and the lateral image.

The second eyeglass fitting parameter measurement device is configured such that, in the first eyeglass fitting parameter measurement device, the magnification correction unit corrects the magnification rate of the front image according to a change in the imaging distance, and maintains the magnification rates of the lateral images such that the reduction scales of the front image and the lateral images displayed on the display part become equal regardless of the change in the imaging distance.

The third eyeglass fitting parameter measurement device includes a fixation target for fixing the examinee's vision. The device is a fixation target presenting optical system capable of changing a presenting distance of the fixation target to the examinee. The front imaging optical system is a front imaging optical system that is capable of changing the imaging distance according to a change in the presenting distance and takes the front image via a diaphragm. The optical system includes a distance-changeable unit. When the presenting distance is changed, the unit changes an optical distance of the diaphragm to the examinee's eye such that the optical presenting distance of the fixation target to the examinee's eye and the optical distance of the diaphragm to the examinee's eye become equal.

The fourth eyeglass fitting parameter measurement device is a front imaging optical system that takes a front image of the examinee wearing an eyeglass frame. The device includes at least a front imaging optical system that is capable of changing the imaging distance of the front imaging optical system to the examinee. The device includes a display control unit and a magnification correction unit, and measures eyeglass fitting parameters based on the front image. The display control unit displays at least the front image taken by the front imaging optical system on the display part. The magnification correction unit corrects the magnification rate of the front image according to a change in the imaging distance such that the reduction scale of the front image displayed on the display part becomes equal regardless of the change in the imaging distance.

The fifth eyeglass fitting parameter measurement device is an eyeglass fitting parameter measurement device that measures the eyeglass fitting parameters for the examinee by analyzing the front image of the examinee wearing an eyeglass frame, the right lateral image of the examinee wearing the eyeglass frame, and the left lateral image of the examinee wearing the eyeglass frame. The device includes a display control unit that displays the front image, the right lateral image, and the left lateral image on the display part at the same time.

The sixth eyeglass fitting parameter measurement device is configured such that, in the fifth eyeglass fitting parameter measurement device, the display control unit displays the left lateral image on the right side of the front image and the right lateral image of the examinee on the left side of the front image on the same screen of the display part.

The seventh eyeglass fitting parameter measurement device is configured such that, in the sixth eyeglass fitting parameter measurement device, the display control unit arranges a display area for the left lateral image and a display area for the right lateral image symmetrically with respect to the central position in a display area for the front image.

The eighth eyeglass fitting parameter measurement device is configured such that, in the fifth to seventh eyeglass fitting parameter measurement devices, the right lateral image and the left lateral image are images taken by a lateral imaging optical system that takes the lateral images of the examinee wearing the eyeglass frame via an odd number of mirrors. The display control unit further includes a reversal processing unit that reverses and displays the right lateral image and the left lateral image on the display part.

In the first eyeglass fitting parameter measurement program executed in an eyeglass fitting parameter measurement device, the eyeglass fitting parameter measurement device including a front imaging optical system that takes a front image of an examinee wearing an eyeglass frame and a lateral imaging optical system that takes a lateral image of the examinee wearing the eyeglass frame, the eyeglass fitting parameter measurement device being for measuring eyeglass fitting parameters based on the front image and the lateral image, the front imaging optical system being capable of changing an imaging distance to the examinee, a processor of the eyeglass fitting parameter measurement device executes the program to cause the eyeglass fitting parameter measurement device to perform: display control of displaying the front image taken by the front imaging optical system and the lateral image taken by the lateral imaging optical system on a display part; and magnification correction of correcting the magnification rate of at least one of the front image and the lateral image according to a change in the imaging distance such that the reduction scales of the front image and the lateral image displayed on the display part become equal regardless of the change in the imaging distance.

In the second eyeglass fitting parameter measurement program executed in an eyeglass fitting parameter measurement device for measuring eyeglass fitting parameters for an examinee by analyzing a front image of the examinee wearing an eyeglass frame, a right lateral image of the examinee wearing the eyeglass frame, and a left lateral image of the examinee wearing the eyeglass frame, a processor of the eyeglass fitting parameter measurement device executes the program to cause the eyeglass fitting parameter measurement device to perform display control of displaying the front image, the right lateral image, and the left lateral image on a display part at the same time.

<Optical Systems>

Some of the optical systems of the example will be described below in detail. The same components as the foregoing ones will be given the same reference numbers as the foregoing ones.

<Distant Measurement Optical System>

Figure 8:
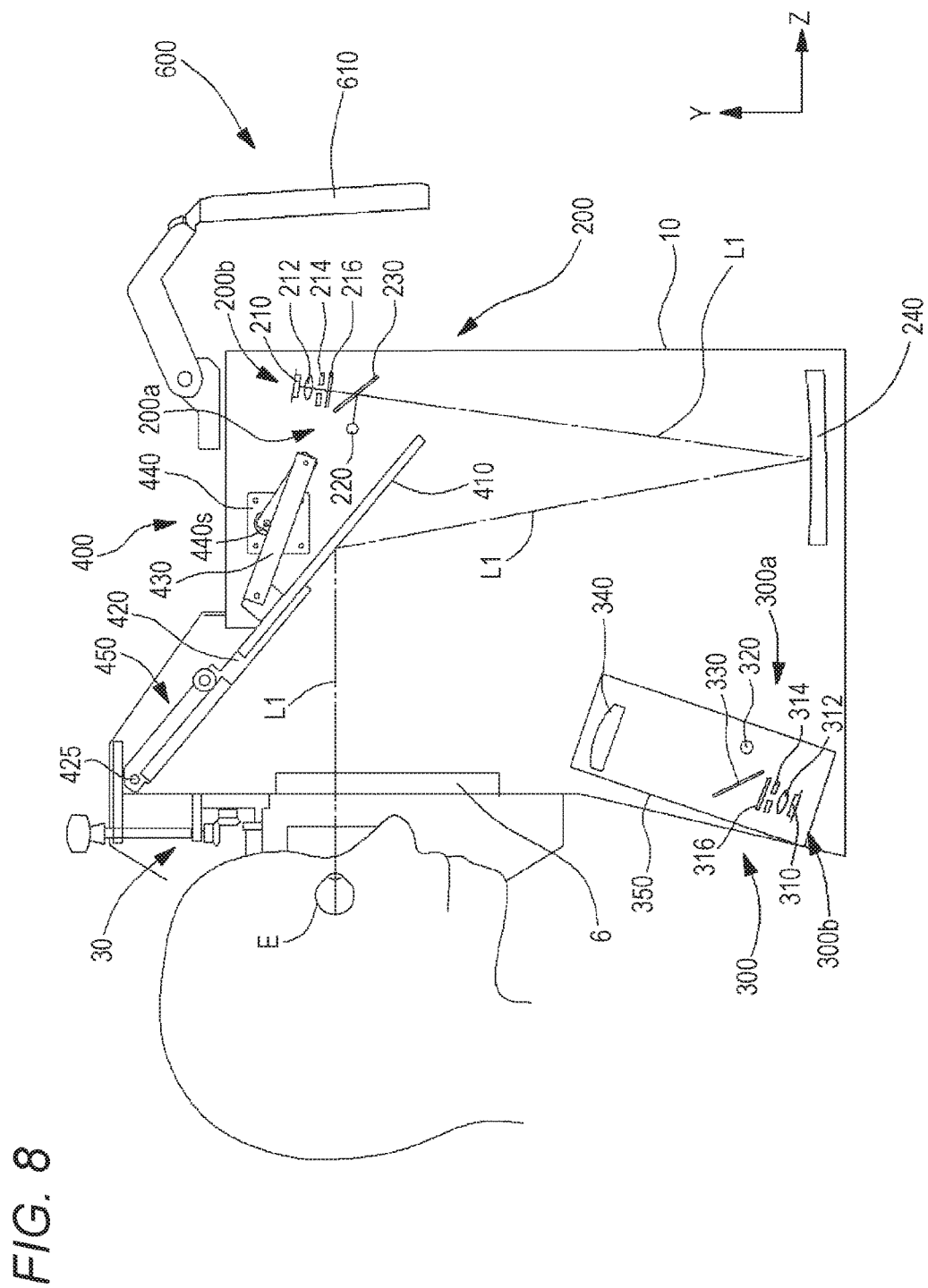
FIG. 8 is a schematic configuration diagram for describing an optical system of the embodiment.

Referring to FIG. 8, the distant measurement optical system (hereinafter, also referred to as first measurement optical system) 200. The distant measurement optical system 200 is an optical system that measures the position of the examinee's eyes E in the distant-vision state relative to the eyeglass frame F. The distant measurement optical system 200 is divided into the first fixation target projecting optical system 200a and the first imaging optical system 200b. The measurement optical axis of the distant measurement optical system 200 is set as optical axis L1.

The fixation target projecting optical system 200a projects a distant fixation target for fixing the examinee's vision in the distant-vision state onto the examinee's eyes E. The fixation target projecting optical system 200a mainly includes the light source 220, the half mirror 230, and the concave mirror 240. The light source 220 is used as a distant fixation target to be projected onto the examinee's eyes E. The concave mirror 240 reflects light flux of the fixation target emitted from the light source 220 at a predetermined presenting distance.

The light flux of the fixation target emitted from the light source 220 is reflected by the half mirror 230 and becomes coaxial with the optical axis L1. The light flux of the fixation target reflected by the half mirror 230 is then reflected by the concave mirror 240. The light flux of the fixation target reflected by the concave mirror 240 is then reflected by the reflective mirror 410 described later, passes through the presenting window 6, and enters the examinee's eyes E from the front direction.

The concave mirror 240 reflects the light flux of the fixation target such that the fixation target is at the distant presenting distance. Accordingly, the fixation target seen from the examinee looks more distant in excess of the actual distance from the examinee's eyes E to the light source 220. In the embodiment, the apparent distance to the distant fixation target is set to 15 m taking human's regular visual lines into account. According to the human's regular visual lines, for example, when a person looks into the distance, the visual lines are directed downward to the ground 10 to 20 m ahead at an angle of about five degrees with respect to the horizontal sight. Therefore, the apparent distance to the distant fixation target is preferably set to 10 m or more.

The apparent distance to the distant fixation target is not limited to 15 m. For example, the apparent distance is set to at least 3 m or more.

The imaging optical system 200b photographs the examinee's face in the distant-vision state from the front direction. To photograph the examinee's face, the entire face may not necessarily be photographed. At least the examinee's both eyes and the eyeglass frame worn by the examinee are to be photographed. The imaging optical system 200b mainly includes the imaging device 210, the imaging lens 212, the diaphragm 214, the infrared filter 216, the half mirror 230, and the concave mirror 240.

Illuminating light from an illuminating optical system 100 for illuminating the examinee's face passes through the presenting window 6 and is reflected by the reflective mirror 410. The light reflected by the reflective mirror 410 is then reflected by the concave mirror 240. The reflected light passes through the half mirror 230 and the infrared filter 216. The infrared light having passed through the infrared filter 216 then passes though the diaphragm 214 and is converged by the imaging lens 212. After that, the converged infrared light forms an image on the imaging device 210. The imaging device 210 detects the light and outputs a detection signal to the controller 70. In the embodiment, the corneal apexes and the imaging device 210 are arranged in a conjugate relation with each other. In addition, the corneal apexes and the imaging device 210 are arranged such that the optical distance from the light source 220 to the corneal apexes and the optical distance from the corneal apexes to the diaphragm 214 become equal. The two are arranged in the same manner as above in the near measurement optical system described later.

When the light flux reflected by the concave mirror 240 is imaged by the imaging device 210, the circumference of the image may look distorted. This is because the shape of the concave mirror 240 has a larger inclination at its circumference. In this case, the controller 70 may correct the distortion of the acquired image by image processing with consideration given to the shape of the concave mirror 240.

When the light flux reflected by the inclined reflective mirror 410 is imaged by the imaging device 210, the taken image may look distorted in a trapezoidal shape. In this case, the controller 70 may correct the distortion of the taken image by image processing with consideration given to the inclination angle of the reflective mirror 410. As a matter of course, each time the inclination angle of the reflective mirror 410 is changed, the amount of correction may be changed.

The infrared filter 216 and the half mirror 230 may be replaced by a cold mirror not illustrated. The cold mirror is a mirror with an optical thin film that lets infrared light through and reflects visible light, for example. The cold mirror may also be used in the near measurement optical system described later.

Instead of the concave mirror 240, a collimator lens, a convex lens, or the like may be used.

<Near Measurement Optical System>

The near measurement optical system (hereinafter, also referred to as second measurement optical system) 300 is an optical system for measuring the positons of the examinee's eyes E in the near-vision state. The near measurement optical system 300 is divided into the second fixation target projecting optical system 300a and the second imaging optical system 300b.

The fixation target projecting optical system 300a projects a near fixation target for fixing the examinee's vision in the near-vision state onto the examinee's eyes E. The fixation target projecting optical system 300a mainly includes the light source 320, the half mirror 330, and the convex lens 340. The light source 320 is used as a fixation target to be projected onto the examinee's eyes E.

The light flux of the fixation target emitted from the light source 320 is reflected by the half mirror 330 and becomes concentric with the optical axis L2. The light flux of the fixation target reflected by the half mirror 330 passes through the convex lens 340 and is converged. After that, the light flux of the fixation target is reflected by the reflective mirror 410 described later, passes through the presenting window 6, and enters the examinee's eyes E.

The imaging optical system 300b photographs the examinee's face in the near-vision state from the front direction. The imaging optical system 300B mainly includes the imaging device 310, the imaging lens 312, the diaphragm 314, the infrared filter 316, the half mirror 330, and the convex lens 340.

Illuminating light from the illuminating optical system 100 for illuminating the examinee's face passes through the presenting window 6 and is reflected by the reflective mirror 410. The light reflected by the reflective mirror 410 passes through the convex lens and is converged. The converged light flux passes through the half mirror 330 and the infrared filter 316. The infrared light having passed through the infrared filter 316 passes through the diaphragm 314, is converged by the imaging lens 312, and then forms an image on the imaging device 310. The imaging device 310 detects the light and outputs a detection signal to the controller 70.

Figure 9A:
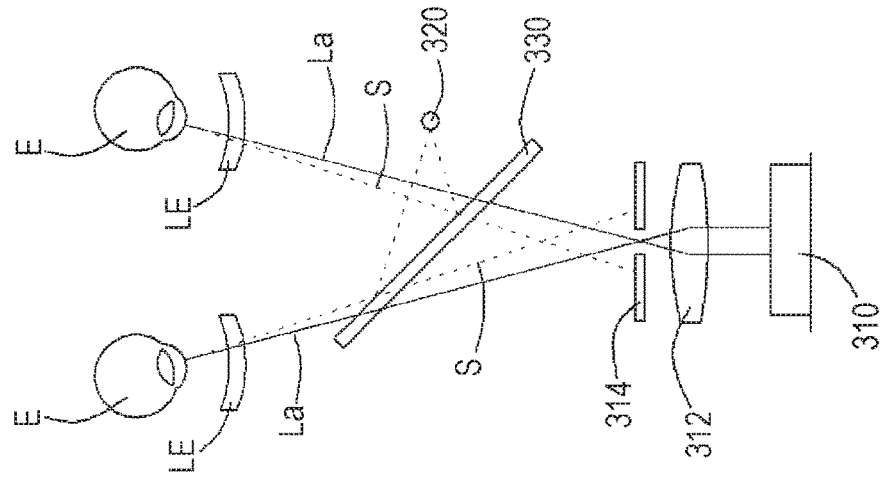
FIGS. 9A and 9B are diagrams of part of a near measurement optical system of the embodiment.
Figure 9B:
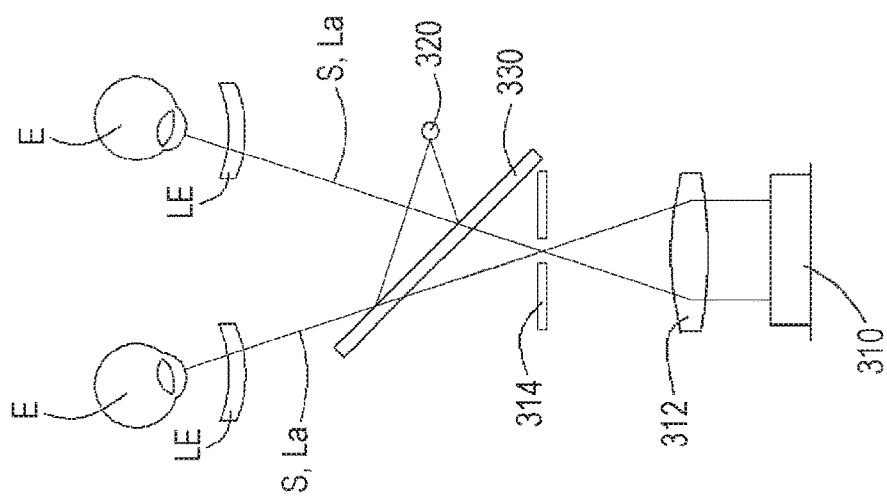

In the device 1, the distance from the fixation target light source to the corneas and the optical distance from the corneas to the diaphragm 314 (diaphragm 214) are the same at the distant-vision measurement and the near-vision measurement. Accordingly, visual lines S of the examinee's eyes E guided to the fixation target and main light rays La connecting the diaphragm and the centers of the pupils are aligned with each other (see FIGS. 9A and 9B). As a result, it is not necessarily required to perform correction calculations to determine the positions of the visual lines passing through the lenses using the front image. The visual lines S and the main light rays La do not need to be rigorously aligned with each other. They merely need to be approximately aligned with each other to a degree that no correction calculations are necessary.

<Optical System Moving Unit>

The optical system moving unit 350 will be described with reference to FIG. 10. The optical system moving unit 350 holds movably the near measurement optical system 300. At the time of near measurement, the optical system moving unit 350 can move the entire near measurement optical system 300 with a change in the angle of the reflective mirror 410 described later.

When the angle of the reflective mirror 410 is changed by the optical path switching unit 400 described later, the optical path of the fixation target projecting optical system 300a (target presenting distance) and the optical path of the second imaging optical system 300b are also changed. Accordingly, the optical system moving unit 350 of the embodiment moves the entire near measurement optical system 300 in conjunction with the change in the angle of the reflective mirror 410. Therefore, the presenting distance of the near target can be maintained even when the angle of the reflective mirror 410 is changed. In addition, the state of the focus of the second imaging optical system 300b on the examinee's eyes E can also be maintained.

The optical system moving unit 350 moves separately the convex lens 340 for adjusting the presenting distance of the near fixation target and the light source 320 for projecting the near fixation target. Accordingly, the optical system moving unit 350 changes the relative distance between the convex lens 340 and the light source 320 to change the presenting distance of the near fixation target.

The optical system moving unit 350 mainly includes a holding unit 351, a first moving support base 352, a second moving support base 353, a first feed screw 354, a second feed screw 355, a first driving part 356, and a second driving part 357.

The holding unit 351 holds integrally and slidably the first moving support base 352 and the second moving support base 353. The imaging device 310, the imaging lens 312 (see FIG. 8), the half mirror 330 (see FIG. 8), and the like are fixed to the first moving support base 352. The convex lens 340 and the first driving part 356 are fixed to the second moving support base 353. The second moving support base 353 holds slidably the first moving support base 352. The first moving support base 352 slides along a slide shaft 353a provided on the second moving support base 353. The slide shaft 353a extends in a direction in which the relative distance between the first moving support base 352 and the second moving support base 353 can be changed. The second moving support base 353 slides together with the first moving support base 352 along slide shafts 351a included in the holding unit 351. The slide shafts 351a extend in a direction in which the relative distance between the second moving support base 353 moving together with the first moving support base 352 and the reflective mirror can be changed.

The upper end of the first feed screw 354 is held by a bearing 353b of the second moving support base 353. The lower end of the first feed screw 354 is coupled to a rotation shaft 356a of the first driving part 356. A nut 352a fixed to the first moving support base 352 is threadably mounted on the first feed screw 354. When the first driving part 356 is driven, the first feed screw 354 is rotated together with the rotation shaft 356a. The nut 352a is moved in a direction in which the slide shaft 353a extends by the rotation of the first feed screw 354 on which the nut 352a is threadably mounted. The first moving support base 352 is moved together with the nut 352a in the direction in which the slide shaft 353a extends. Accordingly, the imaging device 310, the imaging lens 312, the diaphragm 314, the infrared filter 316, the half mirror 330, the light source 320, and the like fixed to the first moving support base 352 are moved in the direction in which the slide shaft 353a extends.

The upper end of the second feed screw 355 is held by a bearing 351b of the holding unit 351. The lower end of the second feed screw 355 is coupled to a rotation shaft 357s of the second driving part 357. A nut 353c fixed to the second moving support base 353 is threadably mounted on the second feed screw 355. When the second driving part 357 is driven, the second feed screw 355 is rotated together with the rotation shaft 357a. The nut 353c is moved in a direction in which the slide shaft 351a extends by the rotation of the second feed screw 346 on which the nut 353c is threadably mounted. The second moving support base 353 is moved together with the nut 353c in the direction in which the slide shaft 351a extends. Accordingly, the convex lens 430 fixed to the second moving support base 353 is moved in the direction in which the slide shaft 351a extends.

As described above, the optical system moving unit 350 serves as a correction unit that moves at least part of the second measurement optical system 300. In the embodiment, the optical system moving unit 350 moves the imaging device 310, the imaging lens 312, the diaphragm 314, the infrared filter 316, the light source 320, and the half mirror 330, as part of the second measurement optical system 300.

<Optical Path Switching Unit>

Returning to FIG. 8, the optical path switching unit 400 will be described. The optical path switching unit switches between the optical paths of the distant measurement optical system 200 and the near measurement optical system 300.

The optical path switching unit 400 can also change the directions of the examinee's visual lines at the time of near measurement.

The optical path switching unit 400 mainly includes the reflective mirror 410, the mirror holding part 420, the link mechanism part 430, and the driving part 440.

The reflective mirror 410 is held by the mirror holding part 420 in front of the examinee's eyes. The upper end of the mirror holding part 420 is held by the rotation shaft 425 fixed to a housing 10. The mirror holding part 420 is turnable around a rotation axis L3 of the rotation shaft 425. The mirror holding part 420 is turned together with the reflective mirror 410. The reflective mirror 410 reflects the light flux of the target emitted from the distant measurement optical system 200 or the near measurement optical system 300 toward the examinee's eyes E. One end of the link mechanism part 430 is coupled to the back surface of the mirror holding part 420. The other end is coupled to a rotation shaft 440s of the driving part 440.

When the driving part 440 is driven by the controller 70 described later, the driving force of the driving part 440 is transferred by the rotation shaft 440s to the link mechanism part 430. Then, the driving force is further transferred by the link mechanism part 430 to the mirror holding part 420.

The mirror holding part 420 is rotated around the rotation shaft 425 by the driving force transferred by the link mechanism part 430. The mirror holding part 420 is rotated together with the reflective mirror 410. When the reflective mirror 410 is rotated, the optical path for the light flux of the target is changed. Accordingly, the presenting position of the fixation target to be projected onto the examinee's eyes E is changed. When the presenting position of the fixation target is changed, the directions of the examinee's visual lines are changed. In this manner, the optical path switching unit 400 turns the reflective mirror 410 to change the presenting position of the fixation target and change the directions of the examinee's visual lines.

The angle formed by the Z-axis direction of the examinee and the reflection surface of the reflective mirror 410 is designated as mirror inclination angle θ. In the embodiment, for example, the reflective mirror 410 can change the mirror inclination angle θ within a range of 40° to 80°. By making variable the angle of the reflective mirror 410, the directions of the examinee's visual lines can be turned downward from the Z-axis direction (0°) to 50° in the near-vision state. Accordingly, the progressive lens can be checked for appropriateness with consideration given to a progressive zone length, for example. The progressive zone length refers to the length of a progressive zone in which a refractive power varies continuously between the distant diopter power measuring position and the near diopter power measuring position in a progressive lens, for example.

<Turning in the Directions of Visual Lines>

The device 1 may further include a turning unit (for example, a light deflecting unit and the driving part 440) (see FIG. 8). The turning unit drives the light deflecting unit (for example, the reflective mirror 410) by the driving part 440 to move the directions of visual lines of the examinee's eyes E in the up-down direction.

The light deflecting unit is arranged in the optical path of the second measurement optical system, for example, to deflect a second measurement optical axis as a measurement optical axis of the second measurement optical system in the up-down direction.

The deflecting unit is not limited to the reflective mirror 410 but may be any other component capable of deflecting an optical axis, such as a prism.

<Correction Unit>

Figure 10:
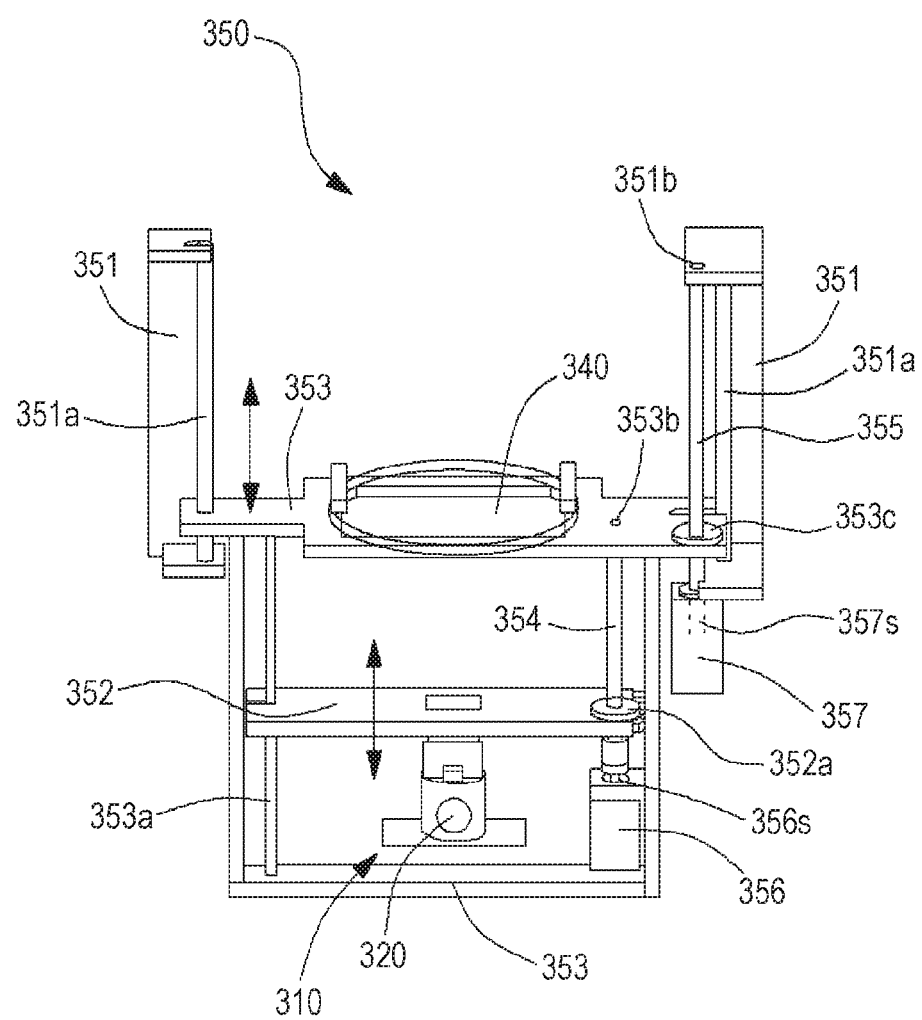
FIG. 10 is a schematic configuration diagram of an optical system moving unit of the embodiment.

The device 1 is further provided with a correction unit (for example, the optical system moving unit 350) (see FIGS. 8 and 10). When the light deflecting unit moves the second measurement optical axis in the up-down direction, the correction unit moves at least part of the second measurement optical system such that the length of the second optical path becomes equal. The correction unit mainly includes the second moving support base 353 and the second driving part 357. The first moving support base 353 holds at least part of the second measurement optical system (for example, the near fixation target, the second imaging device 310, and the convex lens 340). The correction unit drives the second driving part 357 to move the second moving support base 353, for example.

<Distance-changeable Unit>

The device 1 is further provided with a distance-changeable unit (the optical system moving unit 350) (see FIG. 10). The distance-changeable unit moves at least part of the second measurement optical system, for example, to change the optical presenting distance of the near fixation target. The distance-changeable unit mainly includes the first moving support base 352 and the first driving part 356, for example. The first moving support base 352 holds at least part of the second measurement optical system (for example, the near fixation target and the first imaging device 210), for example. The distance-changeable unit drives the first driving part 356 to move the first moving support base 352, for example.

At least either of the first measurement optical system and the second measurement optical system may include, in the optical path, the diaphragms 214 and 314 arranged ahead of the imaging device. The diaphragms 214 and 314 may be arranged such that the optical presenting distance of the fixation target to the examinee's eyes and the optical distance of the diaphragms to the examinee's eyes become equal, for example. Dedicated diaphragms may not be necessarily arranged. Lenses arranged ahead of the imaging device may be used as diaphragms.

The device may include a distance-changeable unit as described below. When the presenting distance is changed, for example, the distance-changeable unit may change the optical distance of the diaphragm to the examinee's eyes such that the optical presenting distance of the fixation target to the examinee's eyes and the optical distance of the diaphragm to the examinee's eyes become equal.

Figure 11A:
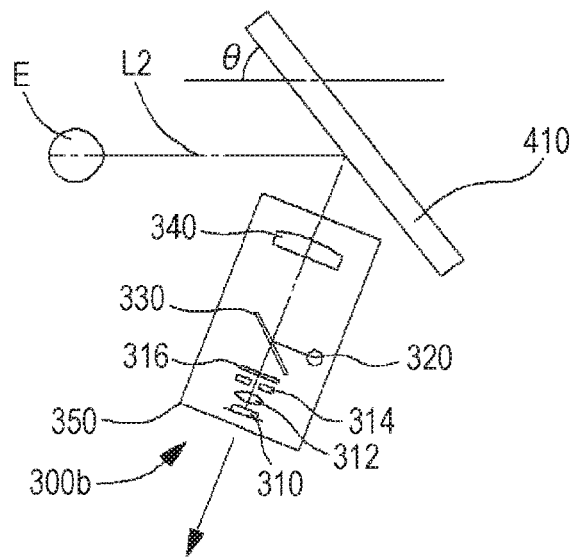
FIGS. 11A and 11B are diagrams of optical arrangements at the time of near-examination.
Figure 11B:
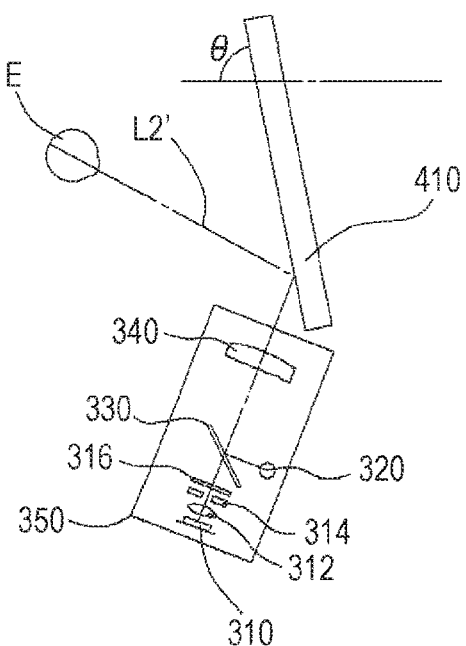

For example, when the presenting distance of the near fixation target is changed, the distance-changeable unit may be capable of changing the optical distance of the diaphragm to the examinee's eyes such that the optical presenting distance of the near fixation target to the examinee's eyes and the optical distance of the diaphragm to the examinee's eyes become equal (see FIGS. 11A and 11B).

The position control of the diaphragm to the examinee's eyes corresponding to the presenting distance of the fixation target is also applicable to a device in which the first measurement optical system and the second measurement optical system are not independently arranged. For example, the position control is also applicable to the case in which the same imaging device and the same fixation target are used in the first measurement optical system and the second measurement optical system.

When the optical systems described above in detail are included in the foregoing configuration, the embodiment of the present disclosure can be expressed as ninth to twentieth eyeglass parameter measurement devices as described below.

The ninth eyeglass fitting parameter measurement device may be configured such that an eyeglass parameter measurement photographing device photographing an image for measuring eyeglass fitting parameters for use in production of eyeglasses includes: a first measurement optical system that is provided with a distant fixation target for fixing an examinee's vision in a distant-vision state and a first imaging device for imaging the both eyes of the examinee set in the distant-vision state by the distant fixation target and for imaging an eyeglass frame worn by the examinee, the first measurement optical system guiding the distant fixation target to the examinee's eyes from a front direction and guiding light from the examinee including the both eyes to the first imaging device; and a second measurement optical system that is provided with a near fixation target for fixing the examinee's vision in a near-vision state and a second imaging device for imaging the both eyes of the examinee set in the near-vision state by the near fixation target and an eyeglass frame worn by the examinee, the near fixation target and the second imaging device being independent of the distant fixation target and the first imaging device, the second measurement optical system guiding the near fixation target to the examinee's eyes and guiding light from the examinee including the both eyes to the second imaging device. The first measurement optical system and the second measurement optical system may be arranged independently from each other.

The tenth eyeglass fitting parameter measurement device is configured such that the ninth eyeglass parameter measurement device further includes an optical path switching unit that switches optically between a first optical path for measuring the eyeglass fitting parameters using the first measurement optical system and a second optical path for measuring the eyeglass fitting parameters using the second measurement optical system.

The eleventh eyeglass fitting parameter measurement device is configured such that the ninth or tenth eyeglass parameter measurement device includes a light deflecting unit that is arranged in the optical path of the second measurement optical system and deflects a second measurement optical axis as a measurement optical axis of the second measurement optical system in the up-down direction and a turning unit that moves the directions of visual lines of the examinee's eyes in the up-down direction.

The twelfth eyeglass fitting parameter measurement device is configured such that, in the eleventh eyeglass parameter measurement device, the second measurement optical system includes a correction unit that, when the second measurement optical axis is moved in the up-down direction by the light deflecting unit, moves at least part of the second measurement optical system using the second measurement optical system such that the length of the second optical path for measuring the eyeglass fitting parameters becomes constant.

The thirteenth eyeglass fitting parameter measurement device is configured such that any one of the ninth to twelfth eyeglass parameter measurement devices has the second measurement optical system that includes a distance-changeable unit moving at least part of the second measurement optical system for changing the optical presenting distance of the near fixation target to the examinee's eyes.

The fourteenth eyeglass fitting parameter measurement device is configured such that, in any one of the ninth to thirteenth eyeglass parameter measurement devices, the first measurement optical system includes a concave mirror that reflects light from the distant fixation target to the examinee's eyes and reflects light from the examinee including the both eyes to the first imaging device, and the presenting distance of the distant fixation target to the examinee's eyes is set to at least 3 m or more, more preferably 10 m or more.

The fifteenth eyeglass fitting parameter measurement device is configured such that any one of the tenth to fourteenth eyeglass parameter measurement devices has an optical path switching unit having a reflective optical member arranged in an optical path common to the first measurement optical system and the second measurement optical system in front of the examinee's eyes and a driving part for changing an inclination angle of the reflective optical member, and is capable of switching optically between the first optical path and the second optical path by switching the inclination angle of the reflective optical member by the driving part driving.

The sixteenth eyeglass fitting parameter measurement device is configured such that the fifteenth eyeglass parameter measurement device includes a light shielding member that is capable of being arranged between the reflective optical member and the examinee to avoid reflection of the examinee's face on the reflective optical member.

The seventeenth eyeglass fitting parameter measurement device is configured such that, in any one of the thirteenth to sixteenth eyeglass parameter measurement device, the second measurement optical system includes a diaphragm arranged ahead of the second imaging device, and when the presenting distance is changed, the distance-changeable unit is capable of changing the optical distance of the diaphragm to the examinee's eyes such that the optical presenting distance of the near fixation target to the examinee's eyes and the optical distance of the diaphragm to the examinee's eye become equal.

The eighteenth eyeglass fitting parameter measurement device is configured such that any one of the ninth to seventeenth eyeglass parameter measurement device includes a window that is arranged opposed to the examinee, fixation target light and imaging light from the first measurement optical system and the second measurement optical system passing through the window.

The nineteenth eyeglass fitting parameter measurement device may be configured such that the eyeglass parameter measurement photographing device includes: a measurement optical system that includes an imaging device imaging the both eyes of an examinee and an eyeglass frame worn by the examinee via a diaphragm; and a fixation target presenting optical system that includes a fixation target for fixing the examinee's vision, the eyeglass parameter measurement photographing device photographing an image for measuring eyeglass fitting parameters for use in production of eyeglasses. The diaphragm is arranged in an optical path of the measurement optical system such that an optical presenting distance of the fixation target to the examinee's eyes and an optical distance of the diaphragm to the examinee's eyes become equal.

The twentieth eyeglass fitting parameter measurement device may be configured such that, in the eyeglass parameter measurement photographing device, a fixation target presenting optical system is a fixation target presenting optical system that is capable of changing a presenting distance of a fixation target to an examinee. The eyeglass parameter measurement photographing device may include a distance-changeable unit that, when the presenting distance is changed, changes an optical distance of a diaphragm to the examinee's eyes such that an optical presenting distance of the fixation target to the examinee's eyes and the optical distance of the diaphragm to the examinee's eyes become equal.

What is claimed is:

1. An eyeglass fitting parameter measurement device comprising:
    a display control by a processor that displays a front image of an examinee wearing an eyeglass frame and a lateral image of the examinee wearing the eyeglass frame on a display part;
    a position information detection by a processor that detects position information for determining the positions of the examinee's eyes or the eyeglass frame based on a first image which is one of the front image and the lateral image; and
    an instruction acceptance device that accepts an instruction from an examiner, wherein
    the display control processor displays, by overlapping with examinee's eyes and the eyeglass frame in the first image, a first target corresponding to the position information and by overlapping with examinee's eyes and the eyeglass frame in a second image which is another one of the front image and the lateral image, a second target at a same height as the first target,
    the position information detection processor detects the position information based on the instruction from the instruction acceptance device for moving one of the first target and the second target with respect to the examinee's eyes and the eyeglass frame displayed on the display part, and
    the display control processor moves another one of the first target and the second target with respect to the examinee's eyes and the eyeglass frame displayed on the display part in synchronization with a result of detection of the position information of the one of the first target and the second target moved based on the instruction.

2. The eyeglass fitting parameter measurement device according to claim 1, wherein
    a second position information detection by a processor that, based on the instruction from the instruction acceptance device regarding the display area for the second image in which the position information is displayed, detects position information for determining the positions of the examinee's eyes or the eyeglass frame in the second image.

3. The eyeglass fitting parameter measurement device according to claim 1, wherein
    the first image is the front image, and
    the second image is the lateral image.

4. The eyeglass fitting parameter measurement device according to claim 1, wherein the display control processor displays the front image, a right lateral image of the examinee, and a left lateral image of the examinee on the display part at the same time.

5. The eyeglass fitting parameter measurement device according to claim 1, wherein the first target and the second target are connected together in the display part.

6. The eyeglass fitting parameter measurement device according to claim 1, wherein
    the lateral image includes a right lateral image and a left lateral image,
    the first image is the front image,
    the second image is one of the right lateral image and the left lateral image,
    the display control processor displays the front image, the right lateral image and the left lateral image on the display part, and displays, by overlapping with examinee's eyes and the eyeglass frame in a third image which is another one of the right lateral image and the left lateral image, a third target at a same height as the first target.

7. A non-transitory storage medium storing an eyeglass fitting parameter measurement program executed by a processor of an eyeglass fitting parameter measurement device for measuring eyeglass fitting parameters for an examinee by analyzing a front image of the examinee wearing an eyeglass frame and a lateral image of the examinee wearing the eyeglass frame to cause the eyeglass fitting parameter measurement device to perform:
    a display control displaying the front image and the lateral image on a display part;
    detecting position information for determining the positions of the examinee's eyes or the eyeglass frame based on a first image which is one of the front image and the lateral image; and
    accepting an instruction from an examiner, wherein
    the display control displays, by overlapping with examinee's eyes and the eyeglass frame in the first image, a first target corresponding to the position information and by overlapping with examinee's eyes and the eyeglass frame in a second image which is another one of the front image and the lateral image, a second target at a same height as the first target,
    detecting the position information is based on the instruction from the examiner for moving one of the first target and the second target with respect to the examinee's eyes and the eyeglass frame displayed on the display part, and
    the display control moves another one of the first target and the second target with respect to the examinee's eyes and the eyeglass frame displayed on the display part in synchronization with a result of detection of the position information of the one of the first target and the second target moved based on the instruction.

8. A non-transitory storage medium storing an eyeglass fitting parameter measurement program executed by a processor of an eyeglass fitting parameter measurement device for measuring eyeglass fitting parameters to cause the eyeglass fitting parameter measurement device to perform:
    a display control displaying on a display part a front image taken by a front imaging optical system configured to take the front image of an examinee wearing an eyeglass frame and a lateral image of the examinee wearing the eyeglass frame taken by a lateral imaging optical system configured to take the lateral image, the front imaging optical system being capable of changing an imaging distance to the examinee;

detecting position information for determining the positions of the examinee's eyes or the eyeglass frame based on a first image which is one of the front image and the lateral image;

accepting an instruction from an examiner; and correcting the magnification rate of at least one of the front image and the lateral image according to a change in the imaging distance such that the reduction scales of the front image and the lateral image displayed on the display part become equal regardless of the change in the imaging distance, wherein the display control displays, by overlapping with examinee's eyes and the eyeglass frame in the first image, a first target corresponding to the position information and by overlapping with examinee's eyes and the eyeglass frame in a second image which is another one of the front image and the lateral image, a second target at a same height as the first target, detecting the position information is based on the instruction from the examiner for moving one of the first target and the second target with respect to the examinee's eyes and the eyeglass frame displayed on the display part, and the display control moves another one of the first target and the second target with respect to the examinee's eyes and the eyeglass frame displayed on the display part in synchronization with a result of detection of the position information of the one of the first target and the second target moved based on the instruction.

9. An eyeglass fitting parameter measurement device executing the eyeglass fitting parameter measurement program according to claim 8.

* * * * *